(12) United States Patent
Arthurs et al.

(10) Patent No.: US 7,937,670 B2
(45) Date of Patent: May 3, 2011

(54) DATA SHARING SYSTEM, METHOD AND SOFTWARE TOOL

(75) Inventors: Brendan P. Arthurs, Malahide (IE); Stanley Kieran Jerrard-Dunne, Leopardstown (IE); Kieran Joseph O'Mahoney, Killarney (IE); Charles Robert Edward Smith, Celbridge (IE)

(73) Assignee: International Business Machines Corporation, Armonk, NY (US)

( * ) Notice: Subject to any disclaimer, the term of this patent is extended or adjusted under 35 U.S.C. 154(b) by 1234 days.

(21) Appl. No.: 11/227,845

(22) Filed: Sep. 15, 2005

(65) Prior Publication Data

US 2006/0064422 A1    Mar. 23, 2006

(30) Foreign Application Priority Data

Sep. 17, 2004    (GB) .................................. 0420673.6

(51) Int. Cl.
*G06F 17/30* (2006.01)
*G06F 17/40* (2006.01)
*G06F 3/048* (2006.01)

(52) U.S. Cl. ........ 715/804; 715/240; 715/735; 715/742; 715/780

(58) Field of Classification Search .................. 715/240, 715/735, 742, 780, 804
See application file for complete search history.

(56) References Cited

U.S. PATENT DOCUMENTS

2004/0090969 A1    5/2004 Jerrard-Dunne et al.
2004/0107404 A1    6/2004 Burns et al.

*Primary Examiner* — Namitha Pillai
(74) *Attorney, Agent, or Firm* — David A. Dagg

(57) ABSTRACT

A method, software tool and system for communicating data between components in a client computer system is provided. The client computer system has a user interface for displaying a page comprising content rendered by a plurality of components. A property broker is provided which maintains a registry of linked source and destination data fields of components of the client computer system. The property broker is notified when a user request is detected by a component registered with the property broker, and a set of components registered with the property broker is then notified of the start of a communication phase. The user request is processed by the actioned component and the value of each source data field updated during processing of the user request is communicated to each component having a linked destination data field. The property broker notifies the set of components when the communications phase has ended, and at least one component then renders content for display.

39 Claims, 14 Drawing Sheets

DATA SHARING SYSTEM, METHOD AND SOFTWARE TOOL

CROSS REFERENCE TO RELATED APPLICATIONS

The present application claims priority under 35 USC 119 to United Kingdom Application Number 0420673.6, filed Sep. 17, 2004.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to the field of data processing and in particular to a method, system and software tool for data sharing between portlets running on a client platform.

BACKGROUND OF THE INVENTION

The World Wide Web is the Internet's multimedia information retrieval system. In the web environment, client machines communicate with web servers using the Hypertext Transfer Protocol (HTTP). The web servers provide users with access to files such as text, graphics, images, sound, video, etc., using a standard page description language known as Hypertext Markup Language (HTML). HTML provides basic document formatting and allows the developer to specify connections known as hyperlinks to other servers and files. In the Internet paradigm, a network path to a server is identified by a Uniform Resource Locator (URL) having a special syntax for defining a network connection. So called web browsers, for example, Netscape Navigator (Netscape Navigator is a registered trademark of Netscape Communications Corporation) or Microsoft Internet Explorer (Microsoft and Internet Explorer are trademarks of Microsoft Corporation), which are applications running on a client machine, enable users to access information by specification of a link via the URL and to navigate between different HTML pages.

When the user of the web browser selects a link, the client machine issues a request to a naming service to map a hostname (in the URL) to a particular network IP (Internet Protocol) address at which the server machine is located. The naming service returns an IP address that can respond to the request. Using the IP address, the web browser establishes a connection to the server machine. If the server machine is available, it returns a web page. To facilitate further navigation within the site, a web page typically includes one or more hypertext references known as "anchors" or "links".

A portal is usually a web application which aggregates content from various different sources and presents it within a portal web page, and may have sophisticated personalization features to provide customized content to users. The portal application can provide a gateway to one or more backend software applications and is often provided on a separate portal server.

The portal server typically arranges web content into a portal page containing one or more portlets. A portlet is a web component, managed by a portlet container, which processes and generates dynamic web content. This content, often called a fragment, can be aggregated by the portal with content from other portlets to form the portal page. The content generated by a portlet may vary from one user to another depending on the user configuration for the portlet.

The portal provides a navigation framework for a set of web pages arranged on the server in a hierarchy. This framework provides a user interface allowing navigation through the hierarchy of pages that are available on the server. The user interface providing this navigation is known as a theme. Each page may contain zero or more portlets, the page arrangement being predetermined and constructed using design or administration tools.

With a standard server-side portal, a client web browser is used to view the aggregated output of several portlets on a single page. Users interact with content produced by the portlets, for example by submitting forms or following links, resulting in portlet actions being received by the portal. When an HTTP request is received by the portal server, it determines if the request contains an action targeted to any of the portlets associated with the portal page. If there is an action targeted to a portlet, the portal requests the portlet container to invoke the portlet to process the action. The portlet processes the action and generates a content fragment to be included in the new portal page. Additionally, all other portlets on the requested portal page refresh and pass a content fragment to the portal. The portal packages each portlet content fragment in a portlet window adding a title and control buttons to each window. This is sometimes called 'wrapping' each supplied content fragment, and the additional markup used to wrap the fragment is called a 'skin'. The skin may include control buttons which may be used, for example, to place the portlet into a specific mode like edit or configure, or to change the display state of the portlet into a maximized or minimized visual state, like you would see in a common windowing system. Then the portal aggregates the portlet windows into a complete portal page, for sending to the client. The web browser renders the code on a display screen of the client.

Navigation to a page served by the portal can be through the navigation framework provided by the theme if a user starts out with a URL to the portal home page, or via URL links to specific pages, or via URL links to an instance of a portlet; in the latter case the portal serves up the complete page containing that portlet.

Many companies have made large investments in the development of portlets to meet their business requirements. At present these are purely server-side applications, accessible only using a client web browser, and generally only while connected to the portal server via some form of network. It would be greatly beneficial for users to be able to continue to use those same portlets while not connected to the network. This could be achieved by rewriting the portlets as standalone applications for deployment on the client side. However, this would require modification of all portlets to allow them to run as standalone applications, which would be a costly and time consuming undertaking likely to discourage a move from server to client side.

Co-pending UK patent applications, filed concurrently with this patent application, and entitled 'Method and Software Tool for the Installation of Portlets into a Client Platform' and 'Client Computer System with Portlet Views', aim to address these problems and allow the migration of portlets into a client computer system. The system allows portlets to be integrated alongside other client applications in a manner transparent to the user.

The portal aggregation model is not adopted, and instead a separate view window is associated with each portlet, with a web browser being run in each of these view windows. The browser is directed to navigate to the page associated with a portlet, thus displaying the content output by that portlet. All communication between the user and the portlet then takes place using HTTP via the embedded browser. Requests to change the mode or state of the portlet can be made through the portlet view tool and these are conveyed to the portlet by redirecting the browser associated with that portlet to a particular URL.

Preferred embodiments of the client computer system allow an unmodified portlet to run inside a window on a rich client platform (also referred to as smart client, fat client or thick client), which is a client that performs most of the processing with little or no processing being performed by a server computer system. Control of the portlet is moved from the portlet markup to the client UI. From the user's point of view, there is no difference between a portlet and any other client side application. A user can interact with the portlet in exactly the same way as they would have interacted with it had it been deployed as a server side portlet.

In this situation the value of hosting portlets on a client is greatly enhanced if the portlets can share data and can cooperate with the other client applications. The present invention aims to provide a modification of the client computer system with portlet views which incorporates the ability for portlets to share data.

SUMMARY OF THE INVENTION

Aspects of the present invention provide a method, software tool and system for communicating data between components in a client computer system. The client computer system has a user interface for displaying a page comprising content rendered by a plurality of components. A property broker is provided which maintains a registry of linked source and destination data fields of components of the client computer system. The property broker is notified when a user request is detected by a component registered with the property broker, and a set of components registered with the property broker is then notified of the start of a communication phase. The user request is processed by the actioned component and the value of each source data field updated during processing of the user request is communicated to each component having a linked destination data field. The property broker notifies the set of components when the communications phase has ended, and at least one component then renders content for display.

The property broker architecture described in U.S. 20040090969 entitled "Portlet Data Sharing System, Method and Program Product", which is incorporated herein by reference, allows a portlet developer to define data fields that are to receive and/or share data with other portlets in a standard portal. This property broker concept has been applied in the present invention and extended to provide a heterogeneous communication mechanism between client-side portlets and other applications running in a client computer system.

An element of the property broker data sharing model described in U.S. 20040090969 is a change to the lifecycle of a portlet to require a notification when the action phase (where property broker communication occurs) is about to begin, and again when the phase is about to end. Preferred embodiments of the present invention avoid the need to modify the portlet lifecycle model, thereby minimizing changes to the portlet API.

In the preferred embodiment of the present invention, notifications of the start and end of property broker communications are relayed to the cooperating components directly by the property broker, which is not aware of the exact nature of the components in question. In this way, all property providers function in a consistent manner, and all receive the same notifications with the same semantics. The reason that this is possible without modifications to the portlet containers is due to the nature of the client side portal, where the client platform has complete control over the presentation and user interaction with every portlet, and so is able to issue the correct events when necessary.

At present, there exist a large number of portlets based on IBM WebSphere™ technology, and an increasing number which are based on the recent JSR(Java™ Specification Request)-168 Portlet API Standard. Despite having the same purpose, the technologies differ considerably in implementation, and provision of support for both is preferable. For this reason, a preferred embodiment modifies the property broker key ideas such that the system functions with multiple types of portlet, with no modifications to existing APIs, and with client-side applications.

A further preferred feature is that the mechanism be configured such that the communication between any two client components proceeds in a manner completely independent of the nature of the components, be they portlets or otherwise.

BRIEF DESCRIPTION OF THE DRAWINGS

In order to facilitate a filler understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
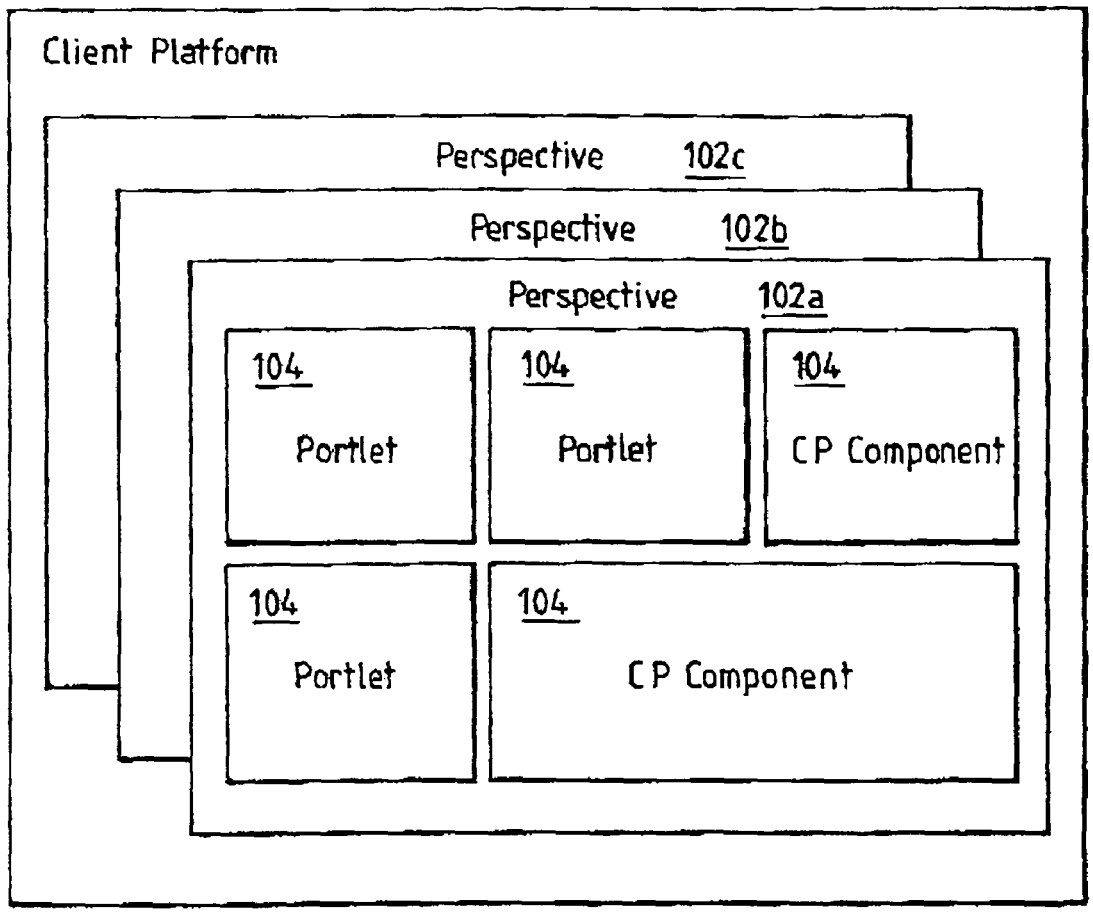
FIG. 1 illustrates an example of a display of a client platform.

In the following description, reference is made to the accompanying drawings which form a part hereof and which illustrate one implementation. It is understood that other implementations may be utilized and structural and operational changes may be made without departing from the scope of the invention.

In our client side approach, a separate view window is associated with each portlet and a web browser is run inside each of these view windows. The browser in a portlet view is directed to navigate to the page associated with that portlet, thus displaying the portlet's output. All communication between the user and the portlet then takes place using HTTP via the embedded browser. Requests to change the mode or state of the portlet can be made through the client platform UI and these are conveyed to the portlet by redirecting the browser associated with that portlet to a particular URL.

The preferred embodiment of the present invention uses a client platform based on Eclipse technology which provides source code building blocks, plug-in frameworks and running examples that smooth the progress of application tools development. It is an environment for creating, integrating and deploying modules, called plug-ins, which may be tools for use across a range of computing environments.

The Eclipse platform defines a Workbench User Interface (UI) and a set of common domain-independent user interaction paradigms that tool builders plug into to add new capabilities. The platform comes with a set of standard views which can be extended by tool builders. Tool builders can both add new views, and plug new domain-specific capability into existing views.

A tool is written as a plug-in that operates on files in Eclipse's file space, called the Workspace, and surfaces its tool-specific UI in the Workbench. When the Eclipse platform is launched, the user is presented with the Workbench window display page which provides an integrated development environment composed of the set of available plug-ins.

Eclipse will run on a wide range of operating systems including Linux™ and Windows™, (Microsoft and Windows are trademarks of Microsoft Corporation in the United States, other countries, or both and Linux is a trademark of Linus Torvalds in the United States, other countries, or both).

The Eclipse platform is described in the Eclipse Platform Technical Overview by Object Technology International Inc, which can be found, for example, at www.eclipse.org, and which is incorporated herein by reference.

The Eclipse platform includes a plugins folder where individual plug-ins are deployed. Each plug-in is installed in its own folder under the plugins folder. A plug-in is described in an XML manifest file, called plugin.xml, residing in the plug-in's folder. The manifest file declares the plug-in's interconnections to other plug-ins and tells the Eclipse platform what it needs to know to activate the plug-in. The parsed contents of plug-in manifest files are made available programmatically through a plug-in registry API and parsed plug-in specifications are cached in an in-memory repository called the plug-in registry.

The Eclipse platform provides a plug-in management kernel and certain core plug-ins that are present in every Eclipse deployment. The identities of these core plug-ins are hard-coded into the Eclipse platform, and the platform knows to activate these plug-ins in each running instance of Eclipse. Non-core plug-ins, on the other hand, are activated when required by other plug-ins.

The interconnection model between plug-ins is simple: a plug-in declares any number of named extension points to which other plug-ins can contribute, and any number of extensions which it contributes to one or more extension points of other plug-ins. A plug-in's extensions can be extended by other plug-ins. An extension point may have a corresponding API interface. Other plug-ins contribute implementations of this interface via extensions to this extension point.

The Eclipse Platform Plug-in Manifest Specification, which is incorporated herein as Annex 1, documents the XML elements and attributes used in defining plug-ins. Each plug-in has a unique identifier (XML attribute id), which is used to refer to a plug-in within the manifest files of other, related, plug-ins. The unique identifier may also be used within provider-supplied plug-in code to access a plug-in's running instance.

Installing a plug-in on the Eclipse platform comprises two stages. The first stage comprises copying the resources that constitute the plug-in (the manifest file, jar or war files, and other resources) into an individual folder for the plug-in, under the platform's 'plugins' directory. The second comprises registering the plug-in, by adding data from the plug-in's manifest file, e.g. a parsed plug-in specification, to the plug-in registry. Once this is done the plug-in can be activated by the Eclipse platform when the plug-in is required to perform some function.

The Eclipse platform User Interface (UI) paradigm is based on views and perspectives. Views are windows which display information about objects; and perspectives provide a display page or canvas on which views can be organized. Plug-ins may contribute views to the platform, and the views can be organized into different perspectives.

The Eclipse Workbench provides a number of extension points including a view extension point. Through this view extension point other plug-ins can contribute views to the platform, by providing one or more extensions to this extension point.

Referring to FIG. 1, there is shown a simple example of a display of a client platform having three different perspectives 102*a*, 102*b*, 102*c*. Perspective 102*a* is displayed uppermost and includes five views 104, three views displaying portlet content alongside two non-portlet views displaying other client platform components. Each of the views displaying portlet content is contributed by a portlet view plug-in as an extension of the Eclipse view extension point. The method of adding portlet views to an Eclipse perspective will be described later.

As has been mentioned in the preamble, portlets are typically run inside portal servers, which aggregate content from all portlets on a page, and return the aggregated content. In the present invention the portal server does riot aggregate content from one portlet with that of another, but rather returns web content provided by a single portlet at a time. The term 'portlet server' is thus used herein, to indicate that the standard portal server process has been modified. As used herein the term 'portlet server' means a server process that uses a protocol such as HTTP to serve markup documents, and any associated files and scripts, from a portlet when requested. The present invention may be implemented with a single portlet server. However, currently several de-facto standards exist for writing portlets. The preferred embodiment supports two (or more) of these standards, namely WebSphere™ portlets and the Java™ Specification Request (JSR)-168 Standard. WebSphere is a registered trademark of International Business Machines Corp. of Armonk, N.Y.

The preferred embodiment provides portlet servers using modified versions of WebSphere Portal Server and JSR-168 Portal Server. The server process serves up a markup document from a single portlet, i.e. with no aggregation of content from different portlets. URLs address individual portlets and return the markup fragment for that portlet alone. The portal server code is cut down so as not to provide any themes, or skins or to perform wrapping of a portlet content fragment. Portal pages are replaced by Eclipse perspectives, with the ability to change perspectives in Eclipse providing the navigation across display pages, and a skin for a portlet content fragment being displayed on a display page is provided instead by a portlet view tool implemented as a plug-in to the Eclipse platform as will be explained below.

Additionally, the Tomcat Application server code and the WebSphere and JSR-168 portal server code is 'slimmed down' as much as possible so as not to include unnecessary functionality, such as server security features (login/authentication etc) which are not required in a client computer system.

The portlet servers are configured to provide for the installation of portlets, as well as to support portlet lifecycles (e.g. Init, Service and Destroy methods) and mode changes. The Init method allows the portlet to be initialized; the service method is called when the portlet is required to render its content; and the destroy method enables portlets to be taken out of service and destroyed.

A preferred embodiment uses an embedded version of a Tomcat Java™ 2 Enterprise Edition (J2EE) application server to host the portlet servers. Tomcat is an open-source implementation of JavaServlet and JavaServer Pages™ technologies developed under the Jakarta project at the Apache Software Foundation (Java and all Java-based trademarks are trademarks of Sun Microsystems, Inc. in the United States, other countries, or both). Additionally, the Tomcat application server provides support for J2EE services such as database connections and Enterprise JavaBeans (EJBs). Other application servers, such as WebSphere Application Server, could equally well be used, as will be appreciated by one skilled in the art.

Figure 2A:
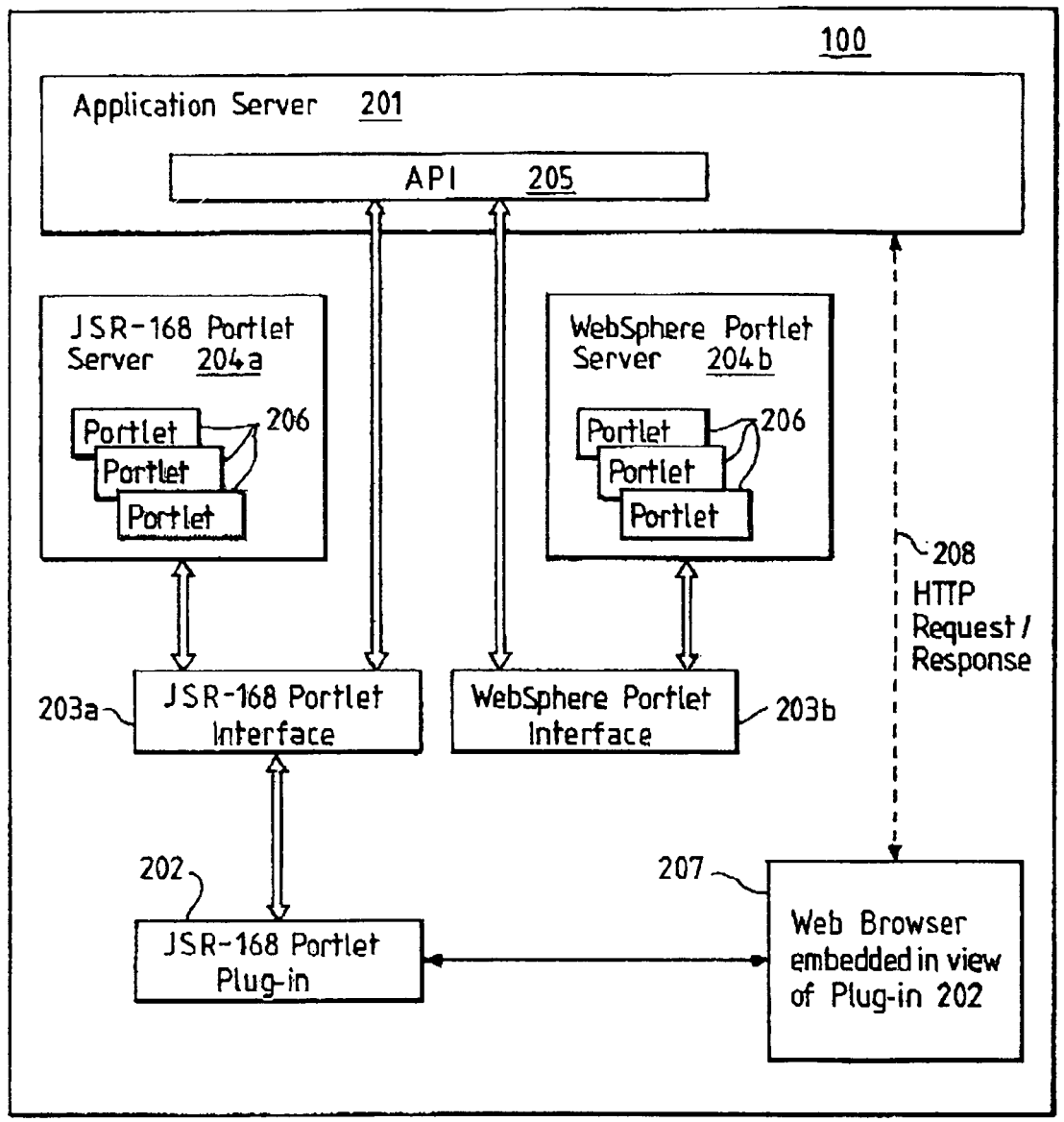
FIG. 2A shows an overview of the interactions between components of a system according to a preferred embodiment of the invention.

FIG. 2a shows an overview of the interactions between components of a system according to a preferred embodiment. The components include a Tomcat Application server 201 and Application server Interface (API) 205, a portlet server for each type of portlet to be supported, here a WebSphere portlet server 204b and a JSR-168 portlet server 204a, portlet interfaces 203a, 203b (which are implemented as part of the portlet servers), a JSR-168 portlet view plug-in 202, associated with one of the JSR-168 portlets 206 installed on the portlet servers 204a, and a web browser 207 which is running within a client view (not shown in FIG. 2a) contributed by the portlet view plug-in 202. The web browser communicates with the Tomcat server 201 using HTTP 208.

Figure 2B:
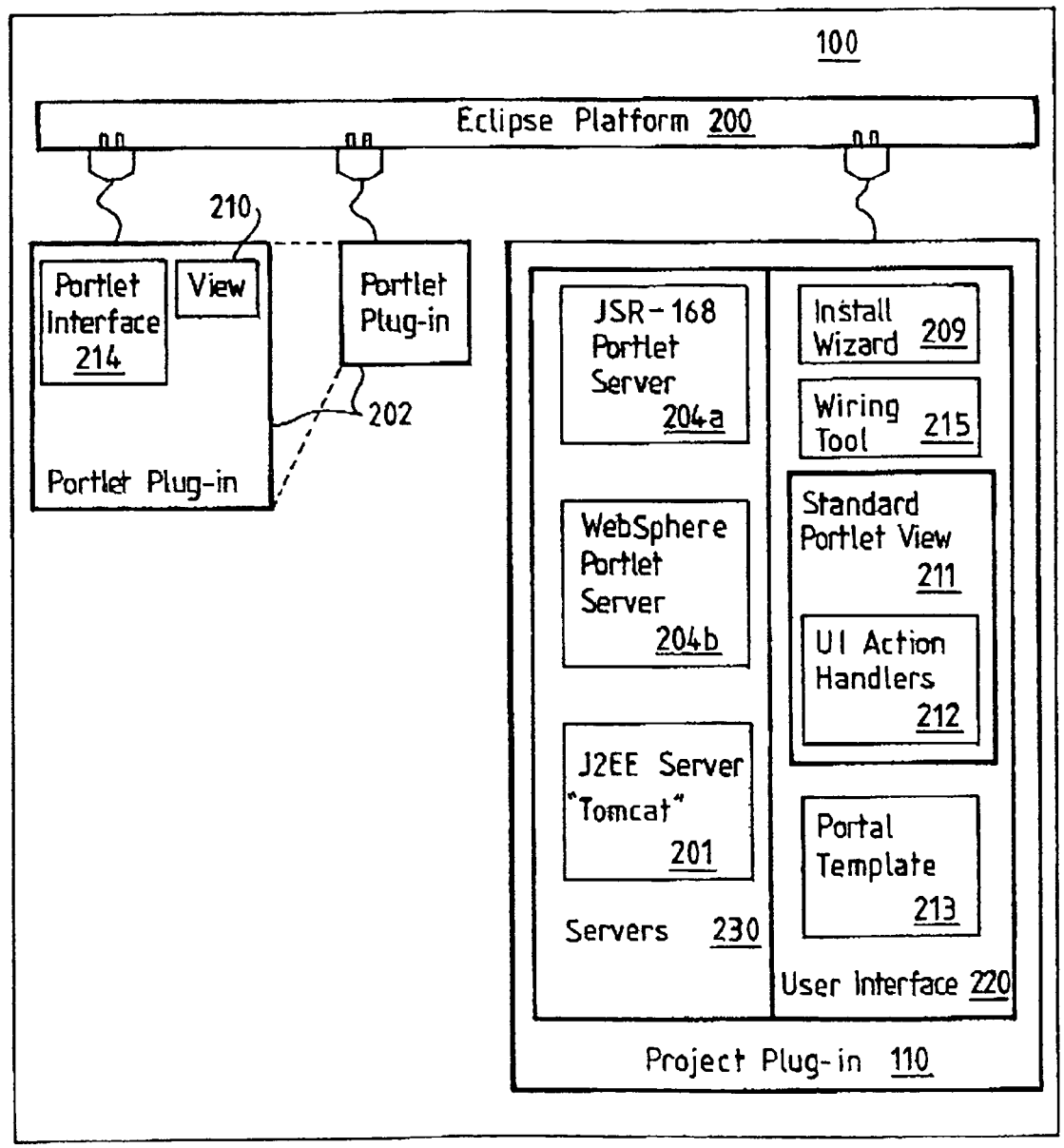
FIG. 2B illustrates a client plug-in architecture and its functional components in which the system of FIG. 2A can be implemented.

FIG. 2b shows the Eclipse plug-in architecture of the preferred embodiment in which portlet view tools are provided as portlet view plug-ins. As shown the client system 100 comprises a plurality of portlet view plug-ins 202 (two shown) and a project plug-in 110. The project plug-in comprises the code which is used to implement the system and which includes a plurality of UI components 220 and a plurality of server components 230. (Although these are illustrated as forming a single plug-in 110 in FIG. 2b, these could be implemented in many separate plug-ins according to preference.) The UI components 220 include an install wizard 209, a standard portlet view 211 which has a UI Action Handler 212, and a portal template 213. The standard portlet view code 211 is used by each portlet view plug-in to wrap its portlet content into a view window, provide control icons, run a web browser etc when a view of its associated portlet is to be displayed.

The portlet install wizard component 209 provides a portlet install menu and the implementation of an install wizard, which creates the portlet view plug-ins 202, and will be described later.

The standard portlet view 211 provides the code required by each portlet view plug-in to implement its view. This enables the portlet view tools to provide frames for the portlet views, portlet control icons for use on the view frames, and run a web browser in each portlet view. The UI Action Handler 212 contains code that is executed by the portlet view tool in response to users clicking on the portlet control icons to indicate a control action.

The portal template component 213 provides a default, initial perspective from which a user may select and open the portlet install wizard 209.

Each portlet installed by the install wizard onto the client is provided with its own associated portlet view plug-in 202. The questions of on which portlet server a portlet is installed, and to which portlet interface 203a,b the portlet interface extension 214 provided by the wizard refers, depend on the type of portlet being installed, i.e. whether it is a JSR-168 or WebSphere portlet.

The portlet view plug-in 202 on the left of FIG. 2b has been expanded to show its contents which are two extensions: namely a portlet interface extension 214, which connects to the servers via a user-defined server extension point 232, and a view extension 210, which extends the Eclipse view extension point. The view 210 references the standard portlet view 211 from which it obtains the code required to run the web browser 207. The web browser 207 can be used to receive web content via HTTP from the portlet server on which the plug-in's associated portlet instance exists. The portlet interface extension 214 contains access data for that portlet server and allows the view 210 to communicate with the associated portlet instance on the relevant portal server. The portlet interface extension 214 includes the name and id of its associated portlet and uses this to refer to the relevant portlet interface 203 (a or b).

The portlet servers 204a and 204b are configured so that when a request for content of a portlet is received, the relevant portlet server, (i.e. the WebSphere portlet server for a WebSphere portlet and the JSR-168 portlet server for a JSR-168 portlet), returns only the content of that individual portlet without aggregating the content with content from other portlets and without packaging the content into a portlet window with title bar and control buttons etc.

The portlet's view plug-in uses a web browser to display this content inside the view window which the plug-in provides in accordance with the portlet's configuration data.

Figure 2C:
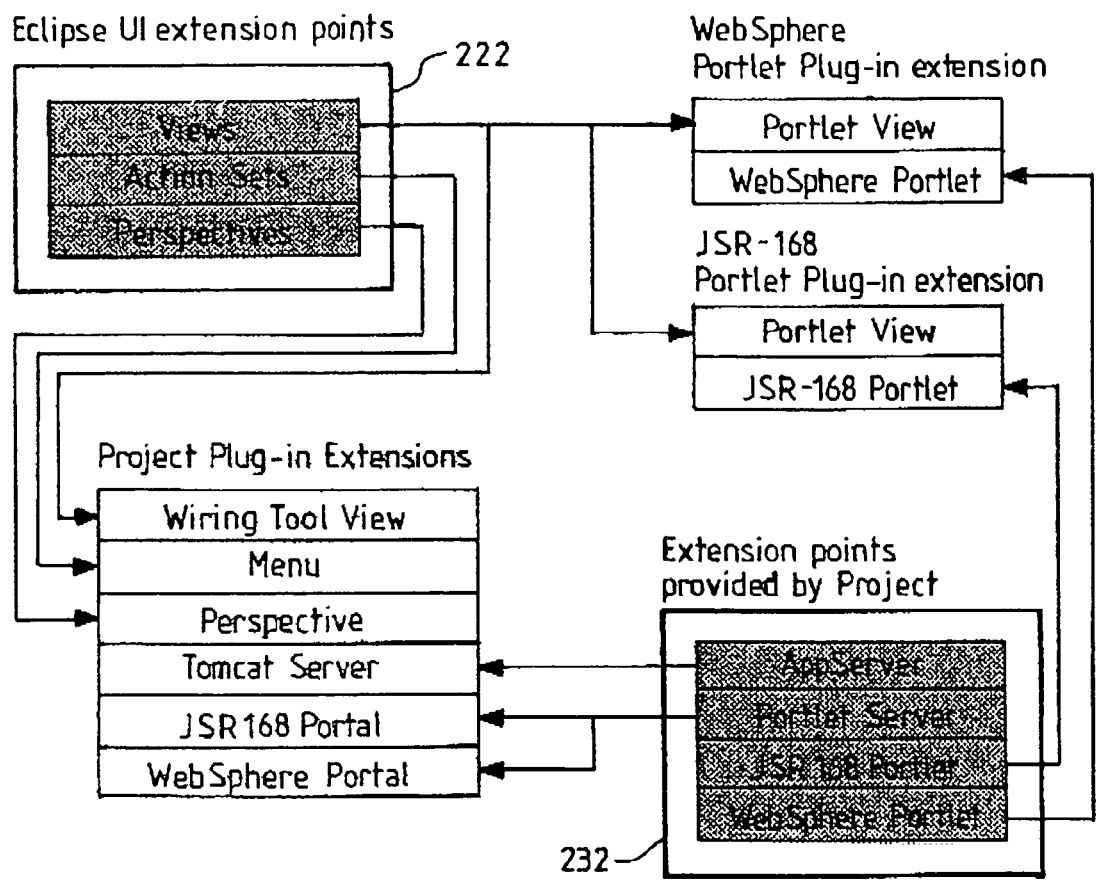
FIG. 2C shows the interrelationship of extension points and extensions of a client computer system according to a preferred embodiment.

As shown in FIG. 2c, the client computer system 100 comprises a plurality of UI extensions which are plugged in to Workbench extension points 222 of the Eclipse Platform, and Server extensions, which are plugged into server extension points 232 declared by the Project plug-in 110.

Referring to FIGS. 2a and 2b, the platform runtime process will now be described. First of all, the Eclipse platform starts up; reading the manifest files of its registered plug-ins, building its in-memory plug-in registry; and initiating its registered plug-ins. Thus the project plug-in 110 is initiated and is thus available to be used with the Eclipse platform. Also, any registered portlet view plug-ins 202 are initiated by the platform. Nothing special happens yet to the portal servers 204a, 204b until a user displays a page containing a view of a portlet or installs a new portlet.

When a user selects a perspective to be displayed which includes a view of a portlet, the associated plug-in must obtain the portlet's markup content and it makes a call to retrieve this. First it calls an interface object for that portlet type to see whether the relevant portlet server 204a, 204b has been started up. If the portlet server has not been started up the portlet interface 203a, 203b tells the application server 201

(via the API 205) to start the relevant portlet server 204*a*, 204*b*. When the portlet server starts up all of its installed portlets 206 will be initialized. The portlet view plug-in 202 associated with the actioned portlet contains a parameter identifying the portlet instance to which it is associated. The portlet view tool creates a view window in which a web browser is run, and makes a query to the portlet instance via the server API passing the id of the portlet instance and the required mode. The portlet server returns the URL and the view passes it to the embedded browser 207. The browser 207 sends the URL request to the application server 201 via HTTP and receives a response including the markup rendered by the portlet. The browser 207 then displays the portlet content according to the received markup. The portlet may contain links to other pages, documents etc, and if a user selects any of these, the linked markup is retrieved by the browser using HTTP.

Interaction between the browser 207 and the portlet server, 204*a* or 204*b*, continues as the user interacts with the portlet 206. Portlet mode or state change requests, for example: Edit, Configure or Help mode, are initiated by the user clicking on one of the control icons in the window frame or skin of a portlet view. The portlet view tool then executes the UI Action Handler 212 which notifies the portlet interface 214 of the actioned view as to which control button has been selected. The portlet interface 214 passes to the web browser the URL from which the view should request new content. The web content received from that URL enables the browser to display the portlet 206 in the requested mode/state.

Figure 3A:
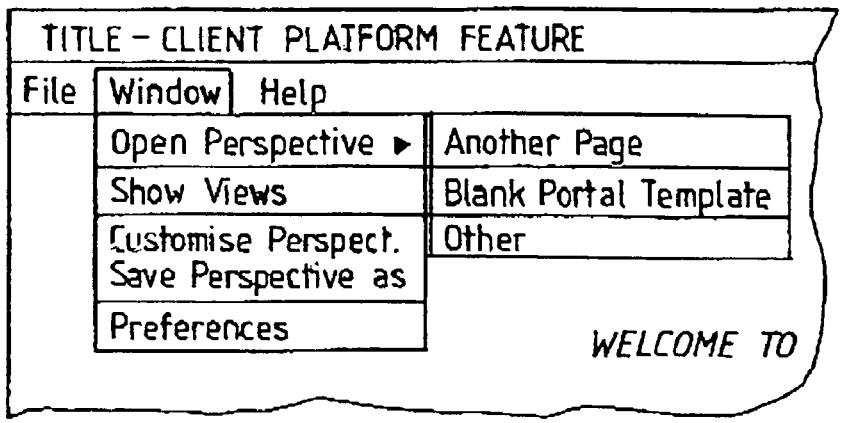
FIGS. 3A, 3B, and 3C show screen shots of display pages or portions of display pages that may be displayed according to a preferred embodiment of the invention.
Figure 3B:
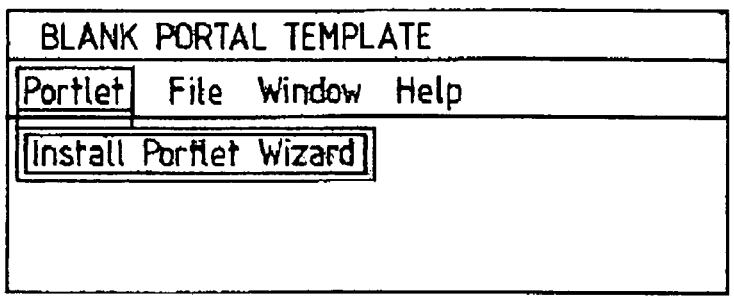
Figure 3C:
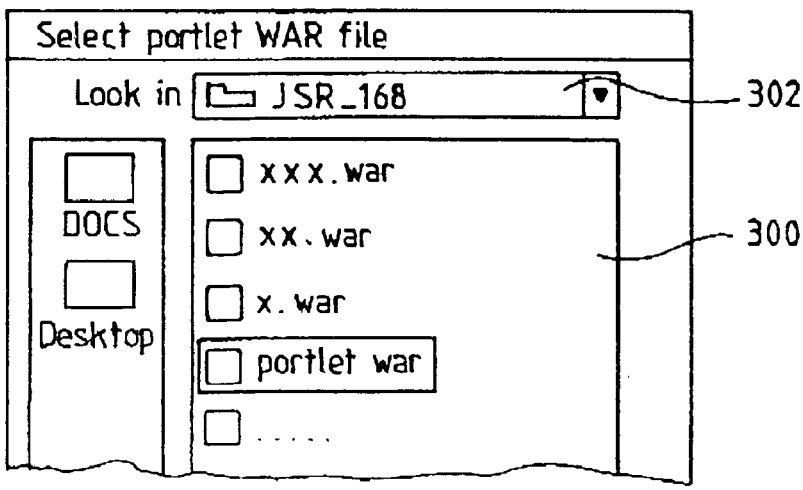

Installation of a portlet will now be described from a visual point of view, with reference to FIGS. 3*a*, 3*b*, and 3*c*. On startup of the platform 200, a welcome perspective will be displayed, typically with a control bar/button from which an option such as 'open blank portal template' can be selected, as shown in FIG. 3*a*. The blank portal template is a tool, (implemented as an extension 213 of a 'perspectives' extension point of the Eclipse UI), which allows a user to create new perspectives and install portlets using an install portlet wizard (see FIG. 3*b*). On selection of the install portlet wizard 209, the user is presented (see FIG. 3*c*) with a file list 300 of portlet web application archive (.war) files in a particular folder 302 of the client system 100. If the user selects one or more portlets from this list, the .war file of each selected portlet will be installed by the wizard onto the relevant portlet server. (A single war file can include a plurality of portlets and the user may be able to select particular portlets within a single .war file for installation). When each selected portlet has been installed the wizard presents a successful installation report to the user, who may then have to restart the client platform to use the newly installed portlets, depending on the particular platform being used. The wizard also provides a client platform view for each installed portlet, and this mechanism will be described in more detail later. These views are thus added to the platform's list of available views, which shows all view extensions, and which a developer or user can use to design new display pages such as new perspectives.

Figure 4A:
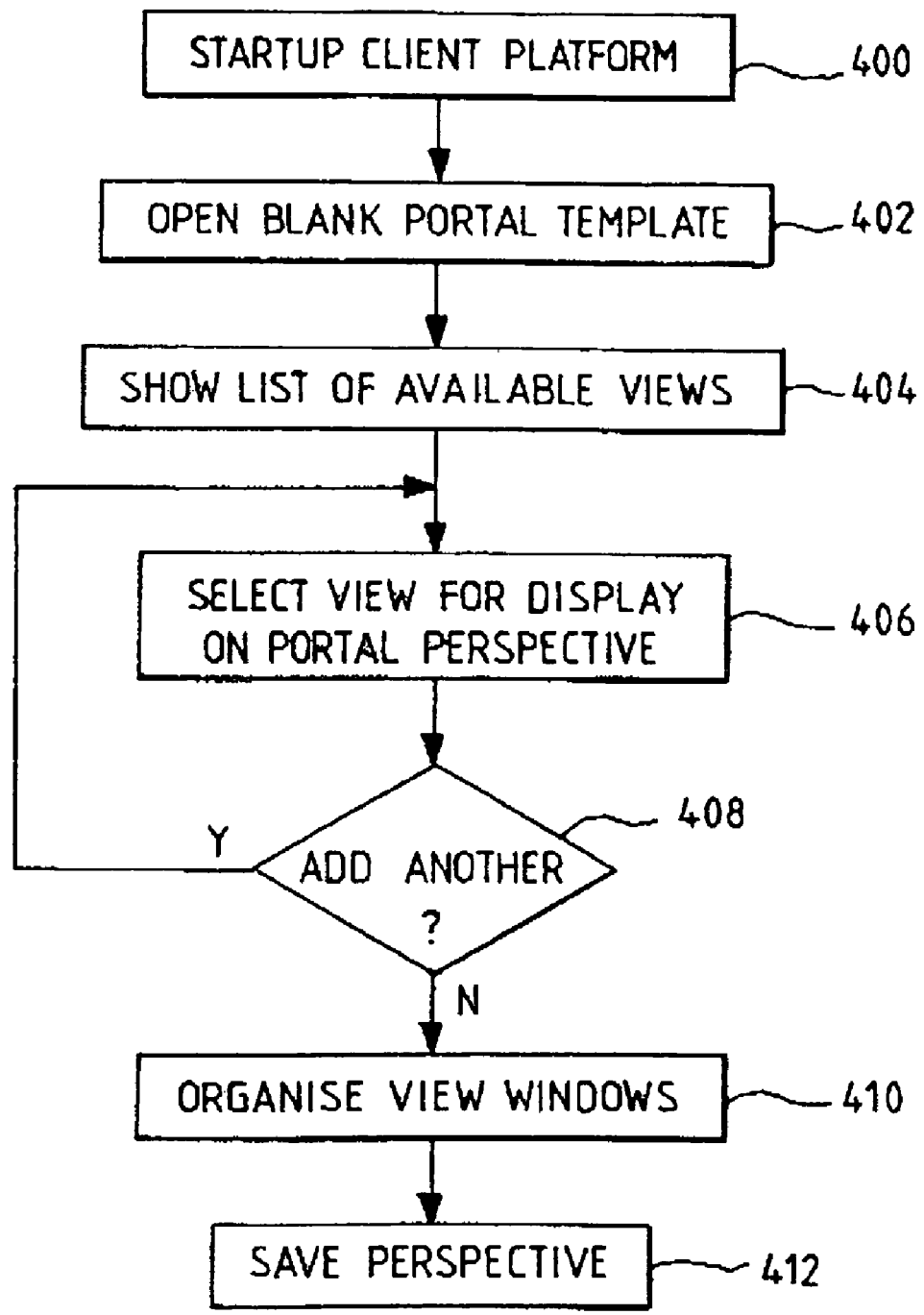
FIG. 4A shows the steps involved in designing a display page according to the preferred embodiment of the invention.

Referring to FIG. 4*a*, to design a new perspective, on startup 400 the user is presented with a menu page (implemented as an extension of the Eclipse UI extension point 'ActionSets') from which the user can select and open 402 the blank portal template. The user selects a 'show view' option from a drop down menu of the template and is shown 404 a list of portlet views and/or client platform component views that are available. Selection of one of the listed views 406 results in that view being instantiated and opened in the current perspective. The user can add more views to the page being created and can organize 410 the views on the page through functions such as resizing, repositioning e.g. drag-and-drop, etc., and can design a perspective which shows views of non-portlet client platform components alongside views of portlets, as shown in FIG. 1. The created perspective can be saved to a list of predefined perspectives 412 which can be recalled as and when needed, in a similar manner to switching to a new page in a portal. When the perspective is closed the views on the perspective will also be closed.

Figure 4B:
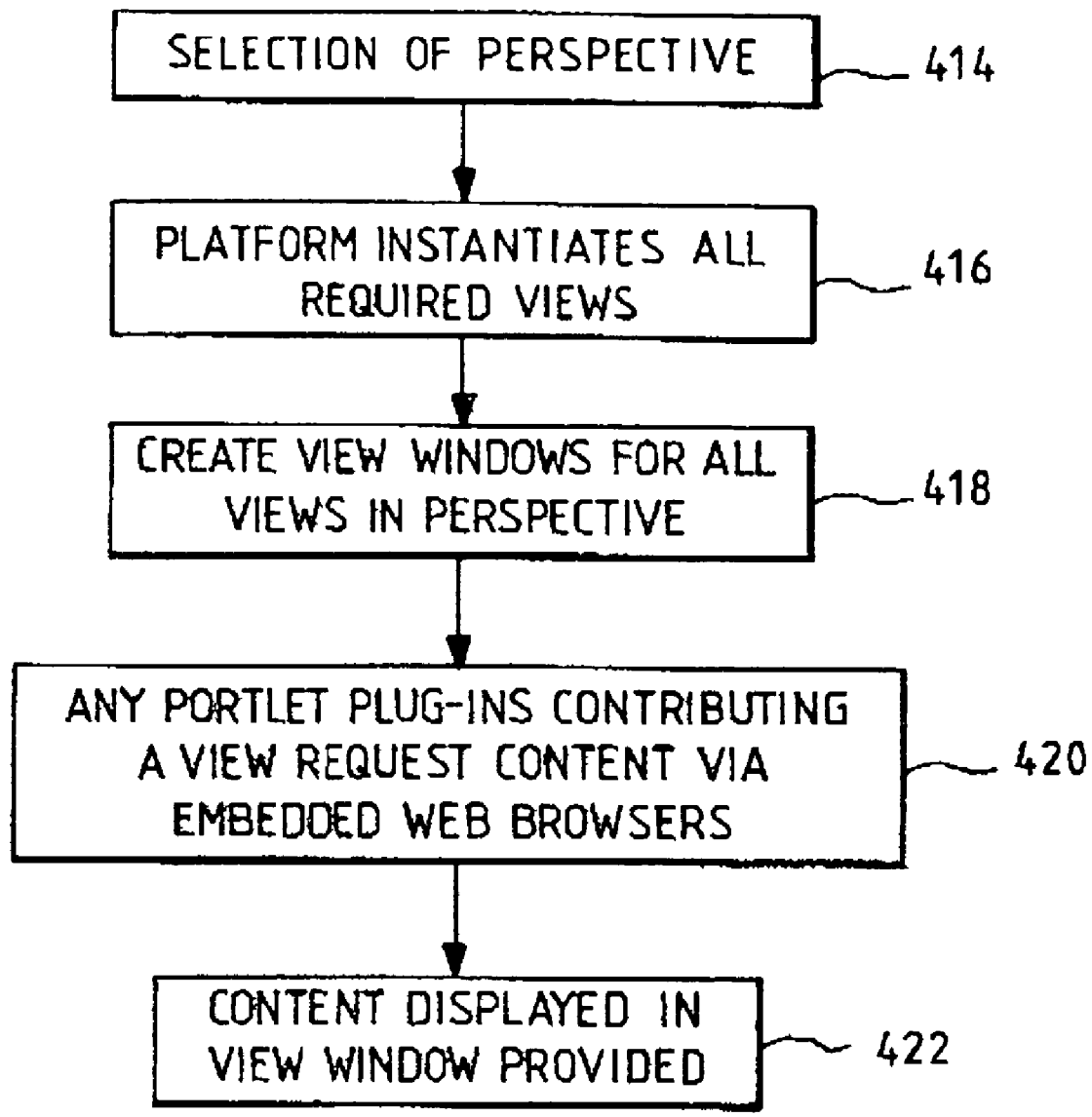
FIG. 4B shows the steps involved in displaying a stored display page according to the preferred embodiment of the invention.

Referring to FIG. 4*b*, when a user requires to display a stored perspective, the required perspective is selected 414 from the drop-down menu under the 'Open perspective' option. The platform 200 then instantiates 416 all the plug-ins having views which are part of the selected perspective and reads their manifest files. From the information in the manifest files the platform uses the portlet view tool to create 418 the frames and any necessary tool bars and menus for each view window and to embed a web browser into each instantiated portlet view. For views contributed by portlet view plug-ins, each relevant plug-in is activated and sends 420 a request for the content of its associated portlet via the embedded web browser. The request goes to the application server which directs it on to the relevant portlet server. (In doing this the application server determines the correct container to process the request by examining the request URL and looking up a mapping table to its containers e.g. the portlet servers.) The perspective is then displayed 422 to the user with any portlet views showing the content received via the embedded web browsers.

The user may then interact with any of the displayed views. If the user interacts with a portlet view for example by clicking on a URL link displayed in the view, the embedded web browser requests the content having that URL from the portlet server via HTTP. The URL addresses a single portlet. The portlet server returns only html content from the addressed portlet, and this is then displayed by the embedded web browser. The rest of the views on the perspective are not refreshed.

Figure 5:
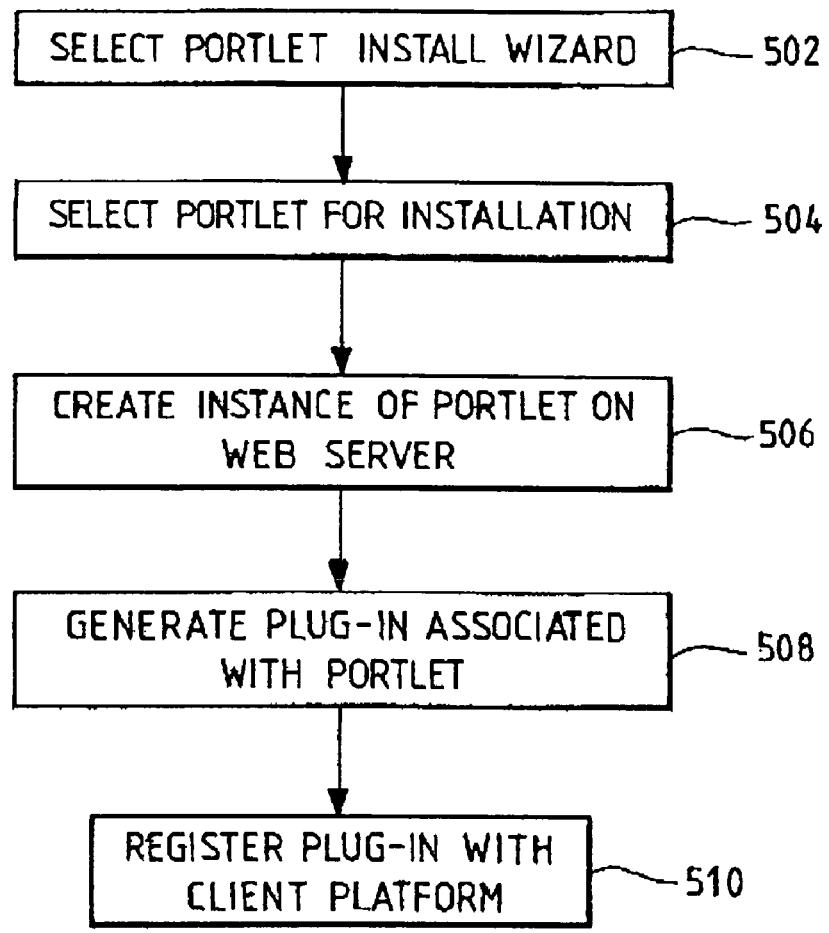
FIG. 5 shows the steps involved in the installation of a portlet according to a preferred embodiment of the invention.

Referring to FIG. 5, the functional steps involved in the installation of a portlet onto the application server will now be described. The Platform is provided with a portlet install wizard, component 209, which, when selected 502 by a user, provides a user interface which enables the user to select a particular portlet war file, from a list of war files. A war (web application archive) file is the normal packaging for a portlet. In response to user selection of a portlet 504, the install wizard 209 determines the portlet type from the war file and creates an instance of a portlet interface 203, initializing the relevant portlet server 204*a*, 204*b* if it is not already initialized. The install wizard 209, via the portlet interface 203*a*, 203*b*, instructs the portlet server 204*a*, 204*b* to install the portlet war file 211, which results in a new instance 506 of the portlet 206 on the portlet server. In this process the portlet server installs the portlet file(s) and adds the portlet details to the registry of its portlet container which manages its portlets.

Upon successful installation of the portlet war file 211, the install wizard 209 generates 508 a new portlet view plug-in 202 associated with that portlet and including its own manifest file. The manifest file lists the display labels (e.g. title of plug-in view), controls and extensions required by the view plug-in, as well as declaring two extensions: a view extension of the Eclipse UI view extension point; and a JSR-168 or WebSphere portlet interface extension 214 which extends the JSR-168 or WebSphere portlet extension points 232 provided by the project plug-in 110. The portlet interface extension enables the portlet to declare which type of portlet it is associated with, and references code, contained in the relevant portlet server component 204*a*, 204*b*, for providing the relevant portlet server interface 203*a*, 203*b*. The view extension references the standard portlet view code which the portlet view plug-in runs when the view is to be displayed to a user. Using this the portlet view tool creates the required menus and toolbars and apply the icons provided by the tool to a frame for the portlet view. Once the portlet view plug-in is registered 510 with the Eclipse platform, a user may add a view of the new portlet to an Eclipse perspective, as described above.

The arrangement differs from that of a portlet instance in a server-side portal in that the portal server 204 in the present system does not aggregate the content from a plurality of portlets into a portal page. Instead each portlet has its own portlet view window which can be displayed on the user's Eclipse platform screen. Moreover, the portal server does not package each portlet content fragment into a portlet window adding a frame, including title and control buttons, to each window. Instead, the portlet view tool provides the frame of its portlet view window, including a title bar and control buttons, according to the portlet view plug-in manifest.

For each portlet installed, a new portlet view plug-in is installed on the Eclipse platform by the install wizard. The Eclipse platform displays each portlet view plug-in in a separate window, or View, each with its own frame, control buttons and embedded web browser.

The mechanism for data sharing between portlets and/or client components will now be described. To implement the present invention, portlets and client components are created with the ability to receive and share data with zero or more other components. In creating a component, the developer defines the data type for each data field (i.e., character, string, real, integer, etc.) within the component. The developer will also define the data field as either an input field, an output field, an internal field, or an input/output field. Data fields specified as input fields or input/output fields can receive data from another component or from a content provider. Similarly, data fields specified as output fields or input/output fields can share data to another component. Data fields specified as internal fields cannot receive or share data with either another component or content provider.

The data sharing mechanism uses a mapping system which allows source fields (i.e., output or input/output fields) of one component to be mapped/linked to destination fields (i.e., input or input/output fields) of another component. When two fields are mapped, the data in the source field will be automatically shared with the destination field. The mapping system typically includes a user interface that allows the developer or user to link ('wire') the desired fields together. Once source and destination fields are mapped, any data in the source field(s) will be automatically shared with the destination field. In providing correct and appropriate mappings, the mapping system can first ensure that the data can properly be shared (i.e., the data types are compatible and the respective fields are properly specified as input and/or output fields). If the sharing is allowed, a graphical representation to display the new mapping can be drawn.

Figure 6:
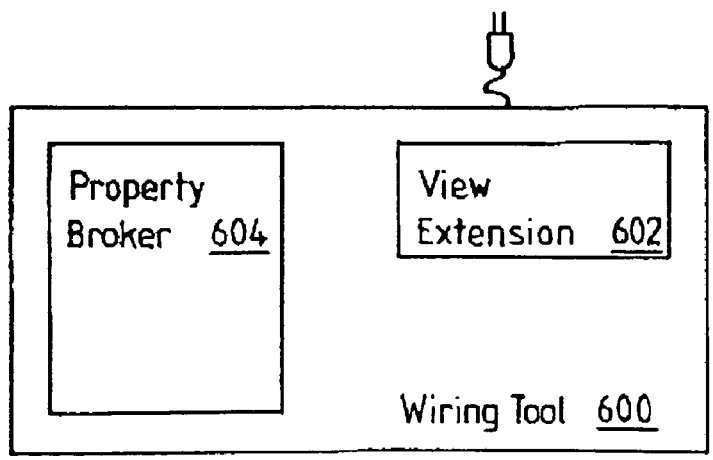
FIG. 6 shows the elements of a wiring tool according to an embodiment of the invention.

In the preferred embodiment the mapping system is implemented as wiring tool 215 in the Eclipse platform described above. As shown in FIG. 6, the wiring tool 215 comprises a View extension, which it contributes to the view extension point of the Eclipse platform, and a property broker.

Each portlet and client component registers with the property broker indicating whether it can publish data and/or consume data by exposing its data fields. The property broker maintains a registry which it can use to map data source fields (i.e., output or input/output fields) of one component to be mapped/linked to destination fields (i.e., input or input/output fields) of another component. When two fields are mapped, the data in the source field will be automatically shared with the destination field. The list of mapped fields or 'wires' may be supplied in an XML document, or edited/created graphically by a user.

As has been explained before, a portlet typically has two main phases in the processing of a request: the action phase and the rendering phase. The action phase is called by the portal server against the specific portlet that has been clicked "actioned", the action is processed and then the render phase is called for all the portlets on the page. The action phase is only called when something in a portlet is clicked, not initially when the page is first displayed.

Notifications of the start and end of property broker communications are relayed to the cooperating components directly by the property broker, which is not aware of the exact nature of the components in question. In this way, all property providers function in a consistent manner, and all receive the same notifications with the same semantics. The reason that this is possible without modifications to the portlet containers is due to the nature of the client side portal, where the client platform has complete control over the presentation and user interaction with every portlet, and so is able to issue the correct events when necessary.

No components (portlets or plug-ins) that participate in brokering of properties are allowed to start rendering content until all property brokering is completed. This is to ensure that the component will not render data that is stale. The data cannot be rendered first because it might be changed by the property broker.

To solve this problem new life cycle methods called BeginEventPhase and EndEventPhase can be introduced to the WebSphere portlet API. These lifecycle phases are guaranteed to be completed before the rendering of portlets began, thus giving the opportunity to complete property brokering. However, because the JSR-168 portlet API standard does not include the BeginEventPhase and EndEventPhase lifecycle methods a new mechanism for coordinating the timing of brokering and rendering for client-side property sharing is required.

In order to achieve this two methods called communicationPhaseBegun and communicationPhaseEnded are introduced. The property broker calls these methods on the portlet plug-in and each other plug-in with a view on the page. When the communicationPhaseBegun method is called the plug-in sets a flag, such as a semaphore, notifying itself not to begin rendering because property brokering is in progress. When the communicationPhaseEnded method is called the plug-in clears the flag, notifying itself that it is now OK to proceed with the rendering of the content. The plug-in then is able to update the embedded browser by passing it the URL.

Note that when property brokering is active all URL clicks in the embedded browser are intercepted by the portlet plug-in, not just the ones to change the portlet mode. This is necessary because any interaction can cause the property brokering cycle to be activated.

To intercept these user actions the portlet plug-in registers an event listener with the embedded browser. Embedded browsers such as Microsoft™ Internet Explorer provide this event listening capability.

Figure 9:
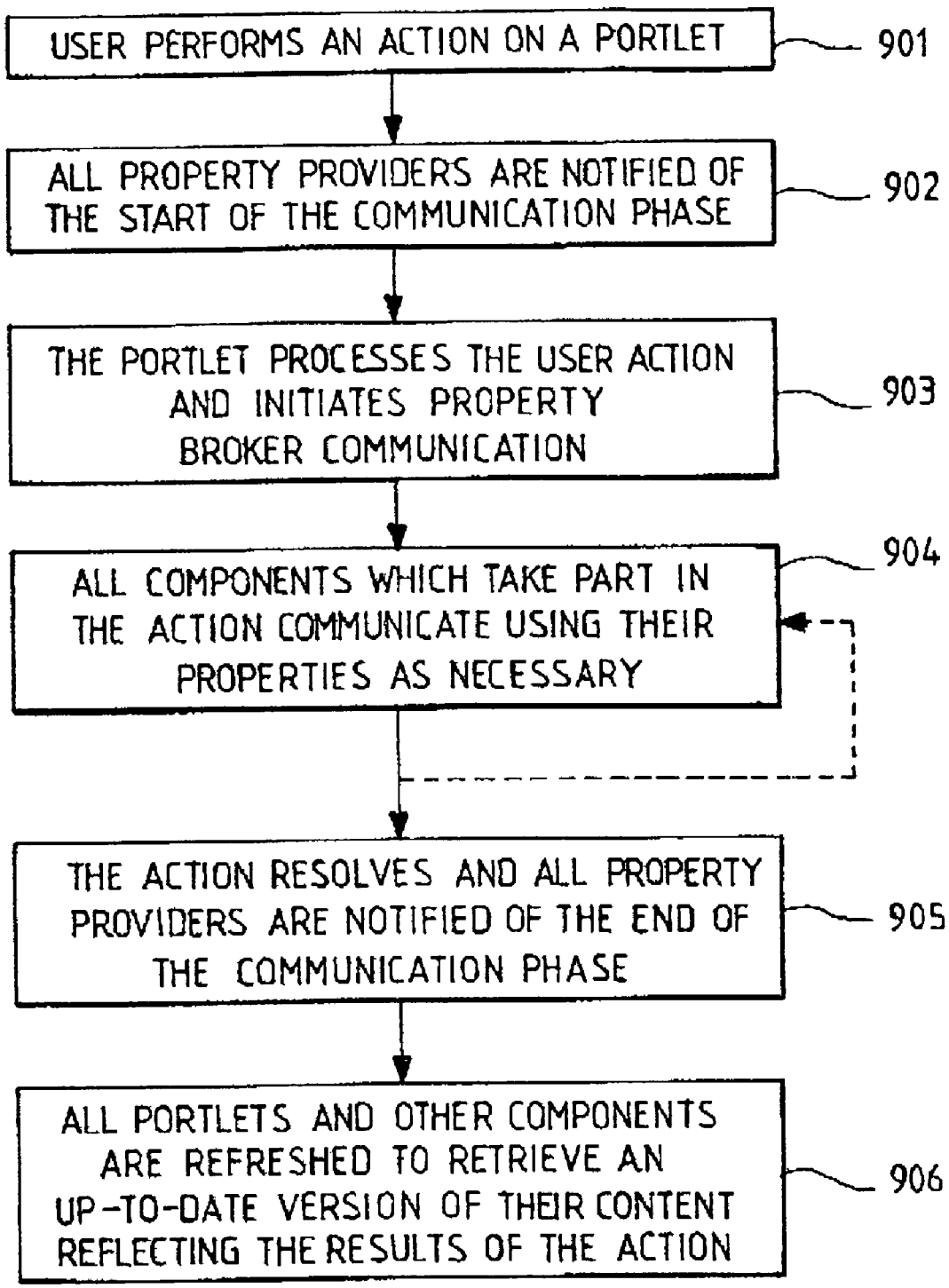
FIG. 9 shows a flowchart of the steps which take place when a user action is detected, according to an embodiment of the invention.

Referring to FIG. 9, which describes the method steps involved when a portlet is the component with which a client interaction is detected. When a user performs an action on a portlet 901 the embedded web browser detects a user click and throws an event notice which is picked up by its associated portlet plug-in. The portlet plug-in then informs the property broker that a new request is about to be processed.

The property broker then informs 902 each component on the page of communicationPhaseBegun. The actioned portlet plug-in now allows its browser to action the URL 903 and the browser sends the URL to the actioned portlet thus triggering both its action processing and rendering phase. The actioned portlet is allowed to render even though the flag is set in the plug-in; this is OK because its property sharing is completed in the action phase. During its action phase the actioned portlet makes calls to notify the property broker of changed properties. In turn the property broker follows its wirings and notifies 904 the target portlets of property changes, thus allowing those portlets to update their data. Those portlets may process the new value of a data property it receives and produce a new value of another data property. If this other data property is a shared property, the portlet will inform the property broker of the new value of that property. The property broker will again use the wirings to notify any linked portlets (or other linked components) of the property changes.

The portlet view plug-in associated with the actioned portlet is made aware that the rendering of the actioned portlet has been completed by its embedded browser via the event listener. The portlet view plug-in then informs the property broker that the request has been completed and the property broker informs 905 each of the other components having a view on the display page that the communications phase has ended by calling the method communicationPhaseEnded. Each other component then refreshes its content 906 to reflect the updated data values, or in a modification, only those components which have changed properties refresh their content. For each portlet view plug-in refreshing involves its embedded browser communicating with its associated portlet via HTTP and the portlet responding with newly rendered content, which reflects any changes that occurred by property brokering.

In the preferred embodiment, each component can read and write data in its own private memory space. When a data value of a source field is modified, the "source" component sends a message to the property broker. The property broker accesses the mappings defined for the source field and sends a message to each "destination" component having a destination field with which the source field is shared. The message includes an identification of the destination field, and the updated data value for the destination field.

It may be desirable to share data between fields having different data types. To address such issues a conversion system can be provided to convert the shared data from a data type/format of the source field to a data type/format of the destination field. Thus, the conversion system allows any number of data types to be accommodated. In order to provide such effective data conversions, conversion data is typically provided (e.g., stored in a database) for access by the conversion system.

When necessary, the property broker can use the conversion system to convert the data between the source field and destination field data types. The "destination" component then writes the new data value in its own private memory space, and executes any functions as required.

Alternatively, the property broker can provide each portlet/component with a list of "destination" components and fields for each shared field. A component can then send a message directly to each "destination" component.

Alternatively, data sharing between components can be implemented using a shared memory. In this case, a component can write all source fields to a shared memory location. Subsequently, another component would read the data from the shared memory location for a mapped destination field. The reading and writing can be performed by the property broker and/or conversion system so that the required communications and data type conversions can be performed without requiring additional functionality in portlets or client components.

FIG. 7 shows a web search Eclipse perspective 700, which comprises views of five portlets, a search bar portlet 701, a search history portlet 702, and three search engine portlets 704, 705, and 706, which are, for example, called 'Youwho', 'Ask Bertie' and 'Goggles' respectively. The web search perspective also includes a wiring tool view 703 contributed by the view extension 602 of the wiring tool. The search bar portlet 701 comprises a search bar 707 into which a user may enter a search term, as well as a search button 708, which is used to indicate that the user wishes to search for the entered term. The search history portlet comprises a display area for displaying the search history (empty in FIG. 7), and includes a 'clear history' button, whereby a user can clear the display area. The perspective shown in FIG. 7 is the base version of the perspective, which is shown when the perspective is first selected by a user, before interaction by a user with any of the views on the page. Each of the search engine portlet views display the message 'No results to display' as no search has yet been carried out.

Figure 8A:
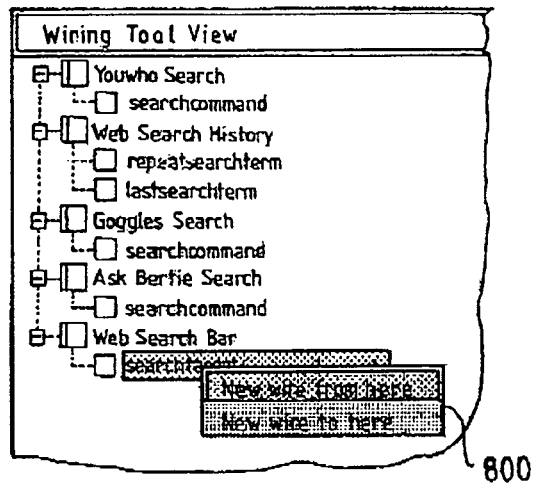
FIGS. 8A, 8B and 8C show screen shots of a wiring tool according to one embodiment of the invention.

The wiring tool view 703 provides a user interface that allows a developer or user to link desired fields together. An exemplary graphical user interface for graphically mapping/linking one or more source fields to one or more destination fields is depicted in FIG. 8A as an Eclipse View of a wiring tool. Using this user interface and the example perspective of FIG. 7A, a method of using the wiring tool 600 to 'wire' the search engine portlets and the search history portlet to the search bar portlet will first be described from a visual perspective.

As shown in FIG. 8A, each component on the page which has been developed to share properties is displayed, with the properties (fields) that it can share shown indented under the name of the component. Thus, the search engine portlets are each listed and each have a property called 'searchcommand'. The search history portlet is listed as 'Web Search History' and has two data fields; 'repeatsearchterm' and 'lastsearchterm'. The search bar portlet is listed as 'Web Search Bar' and has one data field 'searchtarget'.

While not shown, the display of each property in the wiring tool view may be displayed in a different format depending on the property's I/O specification. For example, input fields, output fields, and input/output fields can each be shown in a unique color, incorporate a unique shape or marking, etc.

Figure 8C:
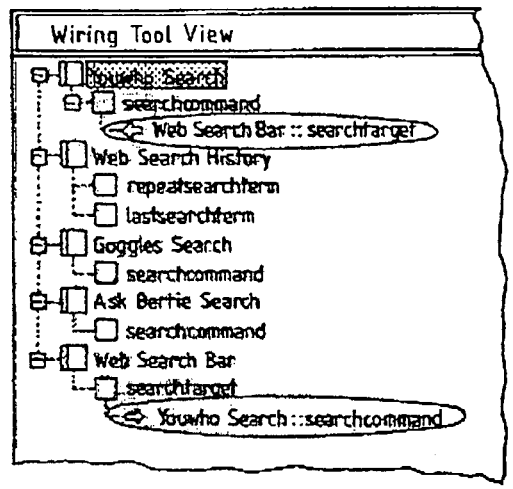

When a user selects a listed property, such as the searchtarget data field, a drop down menu 800 may be displayed. This menu gives the user the options of adding a new wire to the selected property, i.e. designating the selected property as the destination field in a new mapping, or adding a new wire from the selected property, i.e. designating the selected property as a source field. To create a wire connecting the search bar to the Youwho search portlet, the user selects the option of creating a new wire from the searchtarget property. A new window 810 called create new wire is then displayed (see FIG. 8B). This window provides a list of the other portlets and plug-ins and their properties, from which the user can select the searchcommand property of the Youwho search portlet. This leads to connection of the searchtarget string from the search bar to the searchcommand string of the Youwho search portlet, with the searchtarget string being the source field and the searchcommand string being the destination field of the new wire. FIG. 8c shows the display of the wiring tool view showing the connections through the use of arrows under the wired properties.

Figure 7A:
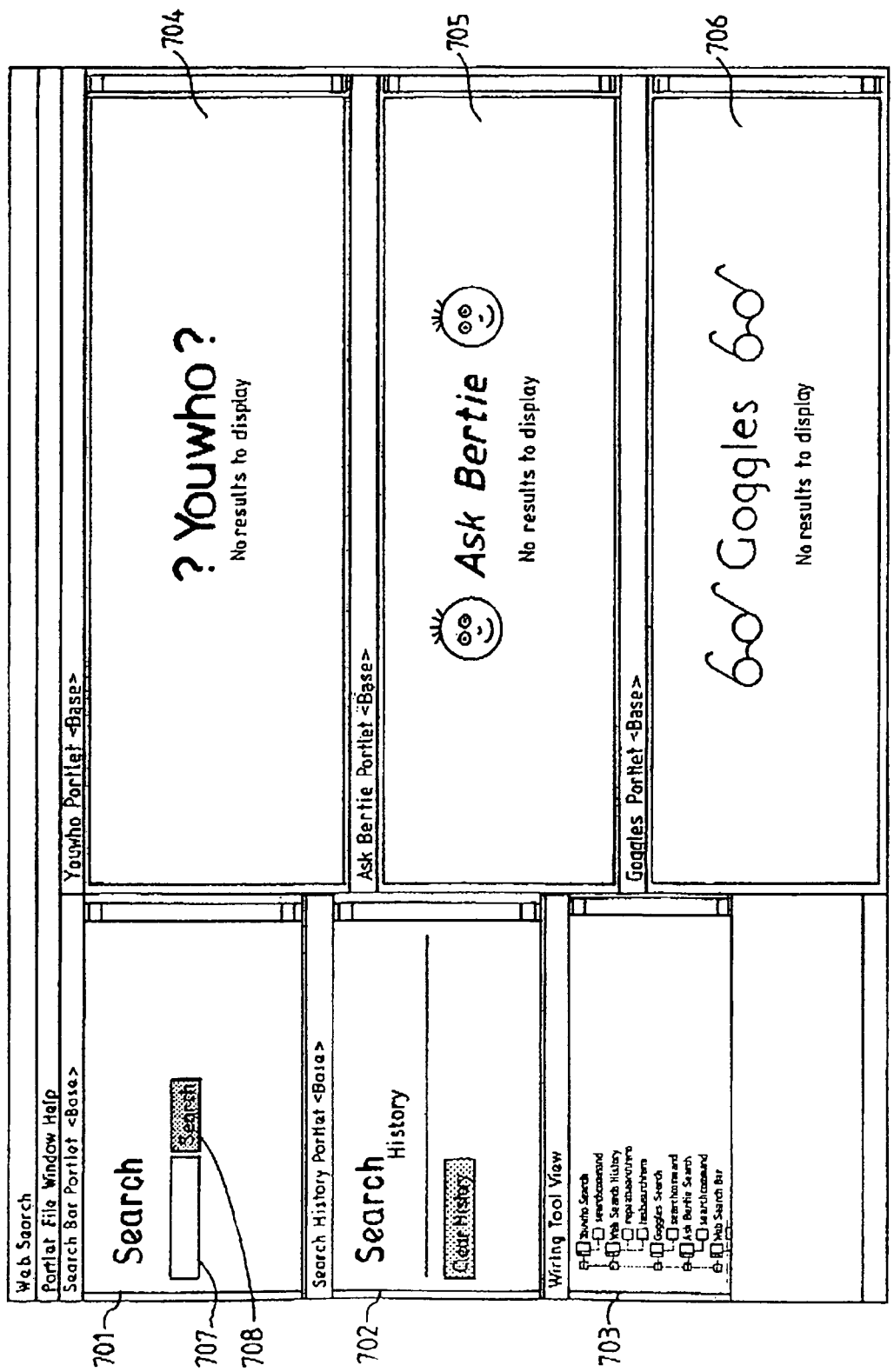
FIGS. 7A, 7B, 7C and 7D show partial screen shots of a perspective according to one embodiment of the invention.
Figure 7B:
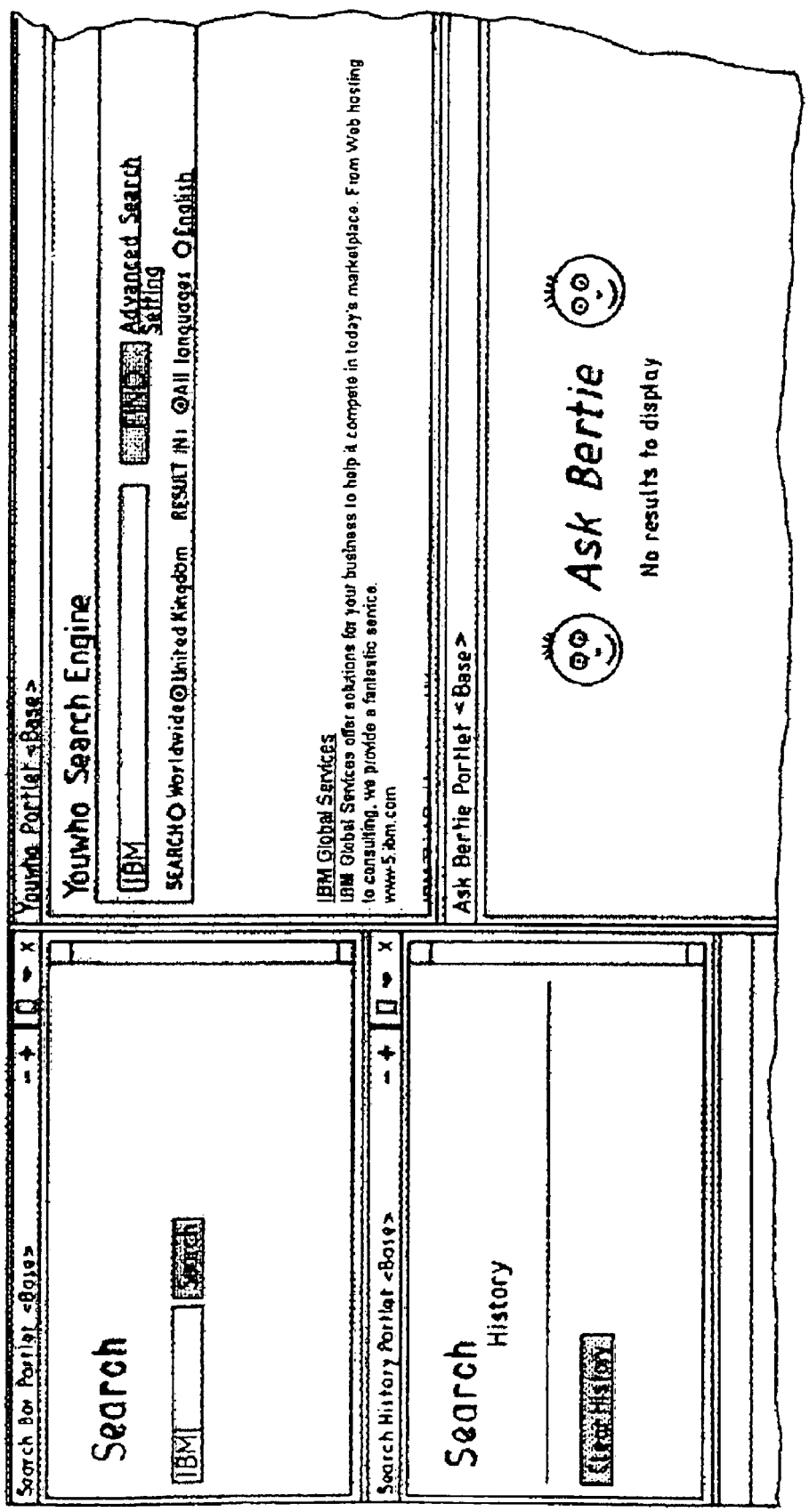

FIG. 7B shows the result that would then be displayed by entering the term 'IBM' into the web search bar and selecting the search button. As shown, Youwho search portlet displays the results of a search using the Youwho search engine for the term IBM. The other two search engines 705, 706, remain in their original 'No results to display' state.

The functions of the property broker, in respect of the embodiment described above with reference to FIGS. 7A to 7C and 8A to 8C, will now be described in detail. As has been described before, the property broker maintains a registry which it uses to map data source fields of one component to be mapped/linked to destination fields of another component. When a user sets up a new wire between two components using the wiring tool, the source component registers its source property and the destination component registers its destination property of the wire. In the example of FIGS. 8A to 8C, the property broker stores a mapping from the searchtarget property of the web search bar portlet to the search command property of the Youwho search portlet. When a user has entered a search term in the search bar, the clicking of the search button indicates an action in the web search bar portlet. The portlet plug-in (not shown) associated with the search bar portlet intercepts this user action and takes the URL and does not yet allow the web search bar portlet to allow the action to perform The web search bar portlet tells the property broker 604 that communications are beginning. The property broker then tells all portlets and client components which have views displayed on the perspective that communication is in progress. The web bar portlet's associated plug-in then passes the URL to its embedded web browser, which uses http to contact the relevant portlet server, which then processes the requested action. During the processing of the action, the web search bar portlet notifies the property broker that its searchtarget property has changed and supplies the new value of the searchtarget property to the property broker. The broker uses its registry and notifies any portlets or client components which are linked to the searchtarget property of the new value of the property. Linked portlets or linked client components may in turn trigger resulting property changes via the broker. In the example of FIGS. 8A to 8C, the property broker notifies the Youwho search portlet of the new value of the searchtarget property, which then modifies its own searchcommand property accordingly. On completion of the action by the web search bar portlet, the portlet sends a new refreshed content for display in its view window by the embedded web browser; and its associated portlet plug-in then notifies the broker that the communication phase is complete. The broker then notifies each of the registered components on the page that the communication phase has been completed. Each of the other portlet/component views appearing on the page is then refreshed. For each portlet, this is achieved by its associated portlet plug-in telling its embedded web browser to refresh. The updated content received back from the relevant portlet server is then rendered in the portlet view window.

During the communications phase, the Youwho portlet gets a new value for its searchtarget property via the property broker, i.e. the search term 'IBM'. During its render phase the Youwho portlet queries its associated search engine on the Web to get the results of a search for the phrase 'IBM'. The results received from the search engine are then rendered by the portlet and sent to the web browser embedded in the associated Youwho portlet view for display on the screen.

Figure 7C:
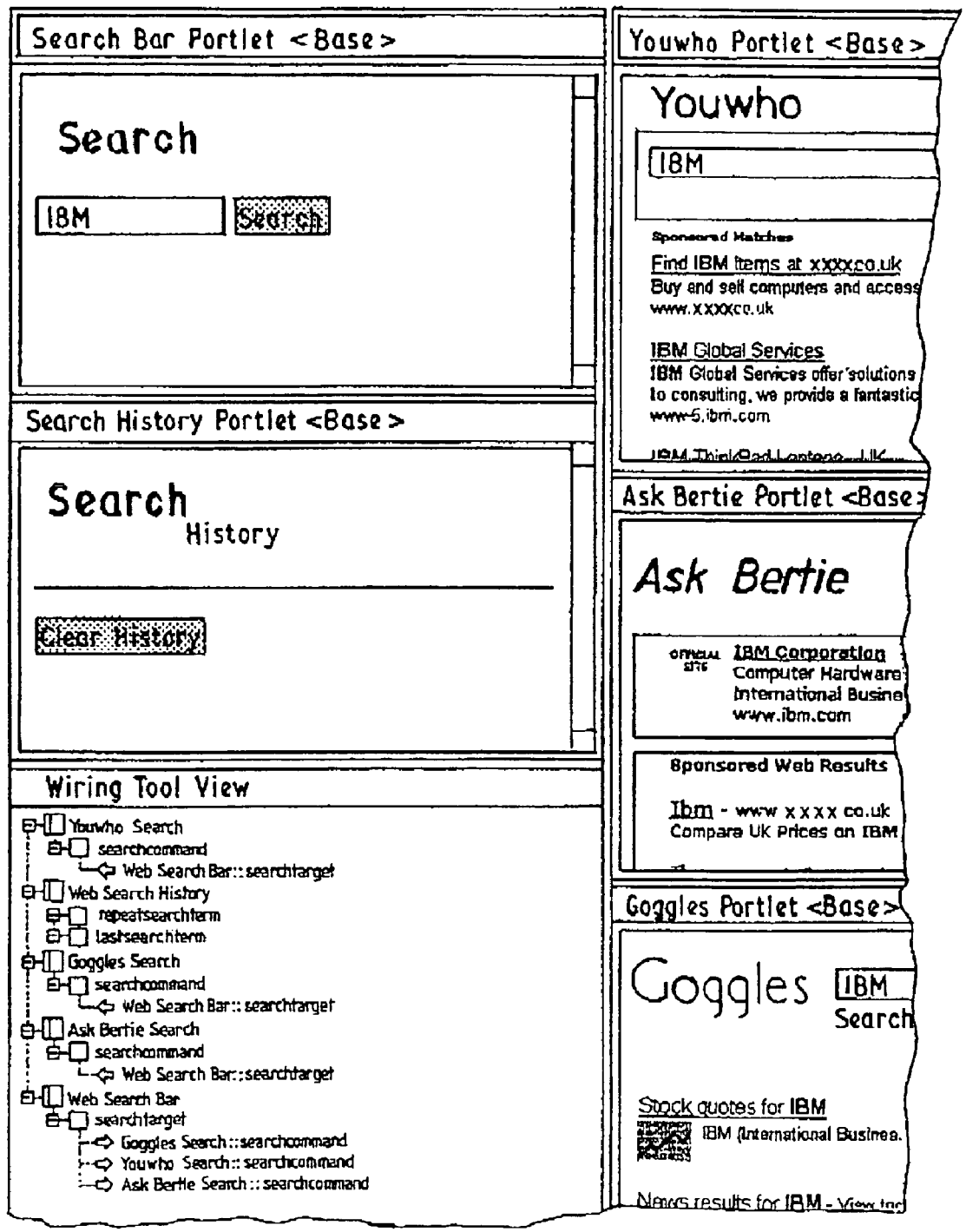
Figure 8B:
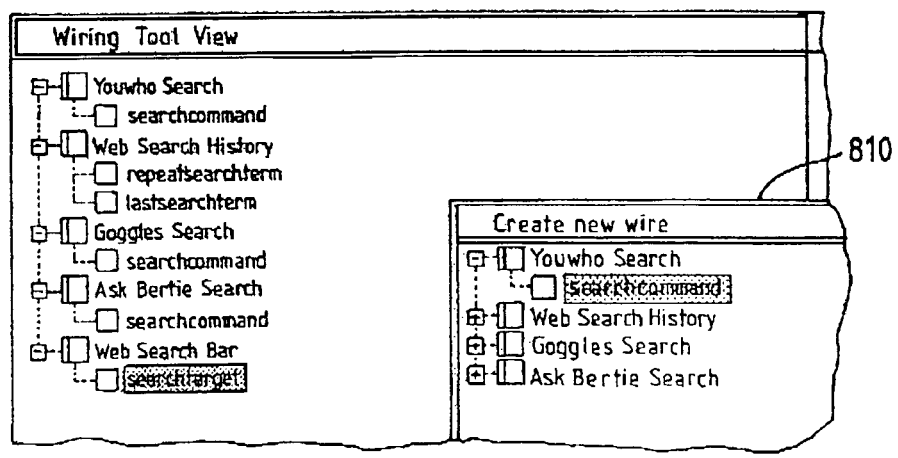

After creating wires from the search bar portlet's searchtarget property to the searchcommand property of each of the other two search portlets, as described above, all three search portlets will react to user selection of the search button in the search bar portlet by searching for the character string entered by the user in the search bar 707, as shown in FIG. 7C.

Figure 7D:
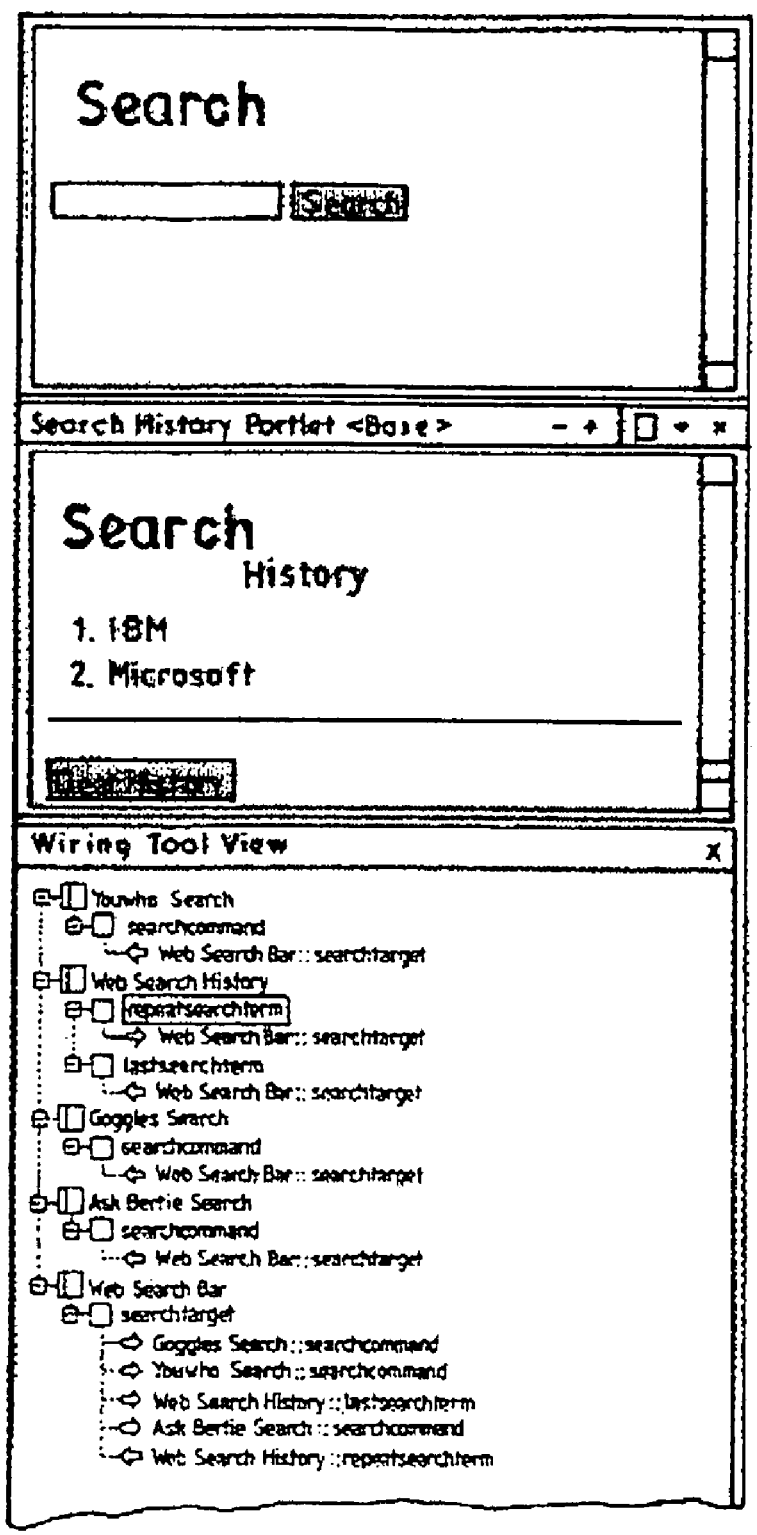

Finally, the search history portlet 702 can be wired up to record searches done through the search bar portlet. To do this the searchtarget property of the web search bar is wired to a lastsearchterm property of the history portlet, which appears at the top of a list of previous search terms it displays. Thus when the search history portlet is refreshed, following the entry of a term or phrase into the web search bar, the new lastsearchterm value is added at the top of its search term list, with the previous search terms moving down the order of the list accordingly. In the example of FIG. 7D, the search history lists the two terms IBM and Microsoft in the list of previous search terms.

A further feature of the search history portlet can be achieved using a repeatsearchterm property of the search history portlet. This repeatsearchterm property is wired to the searchtarget property in the web search bar, which as described above is wired to the searchcommand property of each of the search engine portlets. The repeatsearchterm property is reset by a user clicking on an item in the search history displayed by the history portlet, for example on the term 'IBM' or 'Microsoft', in the example of FIG. 7D. This signifies a request for a repeat of the search for the selected search term(s) to be carried out by the wired search engines.

Alternatively to the user interface displayed in FIGS. 8A, 8B and 8C, a user interface for mapping one or more source fields to one or more destination fields may, for example, comprise a table having a source side and a destination side. Drop down menus can be used to ensure that only valid connections are selected. For example, after selection of a source portlet/component, the fields defined as output or input/output fields may be listed in a source field drop down menu. Destination field(s) can be selected in a similar manner. When a component includes only a single field that is valid for the selection (i.e., a weather portlet including only one input field, a list of cities), then the field can be automatically selected for the user after the component is specified. Similarly, when only two portlets are included on a portal page, once one portlet is selected as a source, the second portlet can be selected as the destination. In any event, as indicated above, once a source field has been mapped to a destination field, any data in the source field will be automatically shared with the destination field.

Although, the embodiment of a method of wiring components described refers to the wiring of portlets, properties of client components could also be wired to those of portlets as well as to those of other client components using the property broker mechanism described above.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example. Further, an article of manufacture including such a computer program is also envisaged as an aspect of the present invention.

A computer program for implementing various functions or for conveying information may be supplied on media such as one or more DVD/CD-ROMs and/or floppy disks and then stored on a hard disk, for example. A program implementable by a data processing system may also be supplied on a telecommunications medium, for example over a telecommunications network and/or the Internet, and embodied as an electronic signal. For a data processing system operating as a wireless terminal over a radio telephone network, the telecommunications medium may be a radio frequency carrier wave carrying suitable encoded signals representing the computer program and data. Optionally, the carrier wave may be an optical carrier wave for an optical fiber link or any other suitable carrier medium for a telecommunications system.

It will be understood by those skilled in the art that, although the present invention has been described in relation to the preceding example embodiments, the invention is not limited thereto and that there are many possible variations and modifications which fall within the scope of the invention.

The scope of the present disclosure includes any novel feature or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

For the avoidance of doubt, the term "comprising", as used herein throughout the description and claims is not to be construed as meaning "consisting only of".

Annex 1

Eclipse Platform
Plug-in Manifest
Version 0.90—Last revised Mar. 15, 2001

The manifest markup definitions below make use of various naming tokens and identifiers. To eliminate ambiguity, here are some production rules for these [are referenced in text below]. In general, all identifiers are case-sensitive.
SimpleToken:=sequence of characters from ('a-z',' A-Z','0-9')
ComposedToken:=SimpleToken|(SimpleToken '.' ComposedToken)
JavaClassName:=ComposedToken
PlugInId:=ComposedToken
PlugInPrereq:=PlugInId|'export' PlugInId
ExtensionId:=SimpleToken
ExtensionPointId:=SimpleToken
ExtensionPointReference:=ExtensionPointID|(PlugInId '.' ExtensionPointId)

The remainder of this section describes the plugin.xml file structure as a series of DTD fragments. File plugin.dtd presents the DTD definition it its entirety.

```
<?xml encoding="US-ASCII"?>
<!ELEMENT plugin (requires?, runtime?, extension-point*, extension*)>
<!ATTLIST plugin
name        CDATA #REQUIRED
id          CDATA #REQUIRED
version     CDATA #REQUIRED
vendor-name CDATA #IMPLIED
class       CDATA #IMPLIED
```

The <plugin> element defines the body of the manifest. It optionally contains definitions for the plug-in runtime, declarations of any new extension points being introduced by the plug-in, as well as configuration of functional extensions (configured into extension points defined by other plug-ins, or introduced by this plug-in). <plugin> attributes are as follows:

name—user displayable (translatable) name for the plug-in
id—unique identifier for the plug-in.
    To minimize potential for naming collisions, the identifier should be derived from the internet domain id of the supplying vendor (reversing the domain name tokens and appending additional name tokens separated by dot [.]). For example, vendor ibm.com could define plug-in identifier com.ibm.db2
[production rule: PlugInId]
version—plug-in version number. See org.eclipse.core.runtime.PluginVersionIdentifier for details. Plug-in version format is major.minor.service. Change in the major component is interpreted as an incompatible version change. Change in the minor component is interpreted as a compatible version change. Change in the service component is interpreted as cumulative service applied to the minor version.
vendor-name—user-displayable name of the vendor supplying the plug-in.
class—name of the plug-in class for this plug-in. The class must be a subclass of org.eclipse.core.runtime.Plugin.

The XML DTD construction rule element* means zero or more occurrences of the element; element? means zero or one occurrence of the element; and element+(used below) means one or more occurrences of the element. Based on the <plugin> definition above, this means, for example, that a plug-in containing only a run-time definition and no extension point declarations or extension configurations is valid (for example, common libraries that other plug-ins depend on). Similarly, a plug-in containing only extension configurations and no runtime or extension points of its own is also valid (for example, configuring classes delivered in other plug-ins into extension points declared in other plug-ins).

The <requires> section of the manifest declares any dependencies on other plug-ins.

```
<!ELEMENT requires (import+)>
<!ELEMENT import EMPTY>
<!ATTLIST import
plugin  CDATA #REQUIRED
version CDATA #IMPLIED
match   (exact | compatible) "compatible"
export  (true | false) "false"
```

Each dependency is specified using an <import> element. It contains the following attributes:
plugin—identifier of the required plug-in
version—optional version specification
match—version matching rule. Ignored if version attribute is not specified. Determines whether the dependency is satisfied only with a plug-in of the specified version (possibly with additional service applied), or the dependency can be satisfied with any compatible version (including a more recent minor version of the plug-in)
export—specifies whether the dependent plug-in classes are made visible (are (re)exported) to users of this plug-in. By default, dependent classes are not exported (are not made visible)

The <runtime> section of the manifest contains a definition of one or more libraries that make up the plug-in runtime. The referenced libraries are used by the platform execution mechanisms (the plug-in class loader) to load and execute the correct code required by the plug-in.

```
<!ELEMENT runtime (library+)>
<!ELEMENT library (export*)>
<!ATTLIST library
    name    CDATA #REQUIRED
>
<!ELEMENT export EMPTY>
<!ATTLIST export
    name    CDATA #REQUIRED
```

The <runtime> element has no attributes.

The <library> elements collectively define the plug-in runtime. At least one <library> must be specified. Each <library> element has the following attributes:

name—string reference to a library file or directory containing classes (relative to the plug-in install directory). Directory references must contain trailing file separator.

Each <library> element can specify which portion of the library should be exported. The export rules are specified as a set of export masks. By default (no export rules specified), the library is considered to be private. The <export> elements have the following attributes:

name—specifies the export mask. Valid values are:
  *—indicates all contents of library are exported (public)
  package-name.*—indicates all classes in the specified package are exported. The matching rules are same as in Java import statement.
  class-name—fully qualified java class name The platform's architecture is based on the notion of configurable extension points. The platform itself predefines a set of extension points that cover the task of extending the platform and desktop (for example, adding menu actions, contributing embedded editor). In addition to the predefined extension points, each supplied plug-in can declare additional extension points. By declaring an extension point the plug-in is essentially advertising the ability to configure the plug-in function with externally supplied extensions. For example, the Page Builder plug-in may declare an extension point for adding new Design Time Controls (DTCs) into its builder palette. This means that the Page Builder has defined an architecture for what it means to be a DTC and has implemented the code that looks for DTC extensions that have been configured into the extension points.

```
<!ELEMENT extension-point EMPTY>
<!ATTLIST extension-point
    name    CDATA #REQUIRED
    id      CDATA #REQUIRED
    schema  CDATA #IMPLIED
```

The <extension-point> element has the following attributes:

name—user-displayable (translatable) name for the extension point id—simple id token, unique within this plug-in. The token cannot contain dot (.) or whitespace.
  [production rule: ExtensionPointId]

schema—schema specification for this extension point. The exact details are being defined as part of the Plug-In Development Environment (PDE). The schema is currently not used at runtime. The reference is a file name relative to the plug-in installation location.

Actual extensions are configured into extension points (predefined, or newly declared in this plug-in) in the <extension> section. The configuration information is specified as well-formed XML contained between the <extension> and <extension> tags. The platform does not specify the actual form of the configuration markup (other than requiring it to be well-formed XML). The markup is defined by the supplier of the plug-in that declared the extension point. The platform does not actually interpret the configuration markup. It simply passes the configuration information to the plug-in as part of the extension point processing (at the time the extension point logic queries all of its configured extensions).

```
<!ELEMENT extension ANY>
<!ATTLIST extension
    point   CDATA #REQUIRED
    id      CDATA #IMPLIED
    name    CDATA #IMPLIED
```

The <extension> element has the following attributes:

point—reference to an extension point being configured. The extension point can be one defined in this plug-in or another plug-in
  [production rule: ExtensionPointReference]

id—optional identifier for this extension point configuration instance. This is used by extension points that need to uniquely identify (rather than just enumerate) the specific configured extensions. The identifier is specified as a simple token unique within the definition of the declaring plug-in. When used globally, the extension identifier is qualified by the plug-in identifier
  [production rule: ExtensionId]

name—user-displayable (translatable) name for the extension

Important: The content of the <extension> element is declared using the ANY rule. This means that any well-formed XML can be specified within the extension configuration section (between <extension> and </extension> tags).

We claim:

1. A method of communicating data between components in a client computer system, the client computer system having a user interface for displaying a page comprising content rendered by a plurality of components, the method comprising the steps of:
  providing a property broker for maintaining a registry of linked source and destination data fields of components of the client computer system;
  notifying the property broker when a user request is detected by an actioned component registered with the property broker;
  notifying, by the property broker responsive to the notifying of the property broker when the user request is detected, a set of cooperating components registered with the property broker of a start of a communication phase, each of the cooperating components and the actioned component comprising a portlet displayed by the client computer system in a separate corresponding view window having a frame and at least one control associated with the view window, each view window further having a separate embedded web browser that requests a web page for the corresponding portlet from a remote portlet server and that displays the portlet within the view window;

preventing rendering of the set of cooperating components during the communication phase, responsive to the notifying by the property broker of the start of the communication phase;

processing the user request by the actioned component;

communicating the value of each source data field updated during processing of the user request to each of the set of cooperating components having a linked destination data field;

the property broker notifying said set of cooperating components of an end of the communication phase responsive to completion of the processing of the user request by the actioned component and rendering of updated content by the actioned component; and permitting rendering of the set of cooperating components after the communication phase, responsive to the property broker notifying the set of cooperating components of the end of the communication phase, by passing uniform resource locators (URLs) of the corresponding portlets to the embedded web browsers of the cooperating components.

2. A method according to claim 1, wherein the destination data field of one of the set of cooperating components to which the updated value is communicated is a source data field linked to a data field of one or more further component(s), the method further comprising communicating the updated data value to each a further component.

3. A method according to claim 1, wherein a destination component to which the updated value is communicated in the set of cooperating components processes the updated value.

4. A method according to claim 3, wherein if processing of the updated value by the destination component updates a value of a source data field of the destination component, the method further comprises communicating the value of the updated source data field to each destination data field linked thereto.

5. A method according to claim 1, further comprising detecting the user request for action by the actioned component.

6. A method according to claim 5, further comprising displaying a page comprising the view windows of the actioned and the cooperating components.

7. A method according to claim 6, wherein the user request for action by the actioned component is detected by detecting user interaction with a view window contributed by the actioned component.

8. A method according to claim 5, further comprising setting an event listener in the actioned component responsive to the detecting of the request for action by the actioned component.

9. A method according to claim 1, wherein the set of cooperating components notified of the start and end of the communication phase is the set of those components which currently have views windows displayed on the display page together with a view window of the actioned component.

10. A method according to claim 1, wherein each of the set of cooperating components having a data field which is updated during the communications phase renders updated content after the communication phase.

11. A method according to claim 1, further comprising displaying an updated page to the user.

12. A method according to claim 1, further comprising running a client platform on the client computer system, the user interface allowing the display of views contributed by plug-in components registered with the client platform.

13. A method according to claim 1, comprising providing a portlet view tool associated with each portlet installed on the portlet server.

14. A method according to claim 13, comprising the portlet view tool intercepting user requests for web content from a portlet.

15. A method according to claim 14, comprising notifying the property broker when a user request is intercepted.

16. A computer system comprising:

at least one display device;

a plurality of components, each having one or more data field(s) and being operable to render content on said display device of said computer system; and a property broker comprising a registry mapping source data fields of source components to destination data field of destination components registered with the property broker;

wherein:

a first component to receive a user request, to send a notification of receipt of the request to the property broker, and to process the user request;

the property broker notifying a set of cooperating components of a start of a communication phase in response to receipt of the notification from the first component, each of the cooperating components and the first component comprising a portlet displayed by the client computer system in a separate corresponding view window having a frame and at least one control associated with the view window, each view window further having a separate embedded web browser that requests a web page for the corresponding portlet from a remote portlet server and that displays the portlet within the view window, wherein rendering of the set of cooperating components on said display device is prevented during the communication phase responsive to notification of the start of the communication phase from the property broker, and the property broker also notifying the set of cooperating components of an end of the communications phase responsive to completion of processing of the user request by the first component and rendering of updated content on said display device by the actioned component, wherein rendering of the set of cooperating components on said display device is permitted after the communication phase responsive to notification of the end of the communication phase from the property broker by passing uniform resource locators (URLs) of the corresponding portlets to the embedded web browsers of the cooperating components;

the value of each source data field in the first component is updated during processing of the user request being communicated during the communications phase to each of the set of cooperating components component having a linked destination data field.

17. A computer system according to claim 16, further comprising communications means for communicating the updated data value to one or more further component(s) when the destination data field of a destination component in the set of cooperating components is also a source data field linked to a data field of said one or more further component(s).

18. A computer system according to claim 16, wherein the property broker is operable to communicate the value of each source data field updated during processing of the user request to each of the set of cooperating components having a linked destination data field.

19. A computer system according to claim 16, further comprising processing means for processing an updated value received by a destination component in the set of cooperating components.

20. A computer system according to claim 19, further comprising means for communicating an updated value of a source data field to each destination data field linked thereto, if processing of the received updated value by the destination component updates a value of a source data field of the destination component.

21. A computer system according to claim 20, in which detecting a user request comprises setting an event listener in the first component.

22. A computer system according to claim 16, further comprising means for detecting a user request for action by the first component.

23. A computer system according to claim 16, further comprising display means for displaying a page on said display device comprising a plurality of view windows each containing content contributed by the first and the set of cooperating components.

24. A computer system according to claim 23, further comprising means for detecting user interaction with a view window contributed by the first component.

25. A computer system according to claim 16, wherein the set of cooperating components to which the property broker is operable to send notifications of the start and end of the communication phase is the set of those components which currently have views windows displayed on the display page together with a view window of the first component.

26. A computer system according to claim 16, further comprising:
a user interface for displaying a page including one or more view window(s) each displaying content provided by a corresponding one of the first component and the set of cooperating components.

27. A computer system according to claim 26, further comprising:
a portlet server for processing requests for portlet content, the portlet server having one or more portlet(s) installed thereon; and
a portlet view tool, associated with a portlet installed on the portlet server, for controlling the associated portlet and for running a web browser for displaying content from its associated portlet in a view window.

28. A computer system according to claim 27, comprising a plurality of portlet view tools, each associated with a portlet installed on a portlet server.

29. A computer system according to claim 27, wherein a portlet view tool comprises a portlet view plug-in associated with the portlet and configurable to contribute a view to the computer system.

30. A computer system according to claim 27, the system comprising a plurality of portlet servers, each having one or more portlets installed thereon.

31. A computer system according to claim 30, wherein the portlet view tool comprises a portlet interface for enabling interaction with the associated portlet on the relevant portal server.

32. A computer system according to claim 27, wherein the portlet view tool is configurable to provide a frame for the view window displaying portlet content.

33. A computer system according to claim 27, wherein the portlet view tool comprises means for determining a URL for portlet content to be requested by the web browser for display in the portlet view window.

34. A computer system according to claim 16, further comprising:
means for running a client platform; and
a user interface allowing the display of views contributed by plug-in components registered with the client platform.

35. A client computer system including a computer readable storage medium, the computer readable storage medium having program code stored thereon, the program code including a software tool for communicating data between components in the client computer system, the client computer system having a user interface for displaying a page comprising content rendered by a plurality of the components, the software tool comprising:
program code to maintain a registry of linked source and destination data fields of the components in the client computer system;
program code to receive notification of detection of a user request by an actioned one of the components in the computer system;
program code to notify a cooperating set of components in the computer system of the start of a communication phase responsive to the detection of the user request by the actioned one of the components in the computer system, each of the cooperating components and the actioned component comprising a portlet displayed by the client computer system in a separate corresponding view window having a frame and at least one control associated with the view window, each view window further having a separate embedded web browser that requests a web page for the corresponding portlet from a remote portlet server and that displays the portlet within the view window;
program code to prevent rendering of the set of cooperating components during the communication phase, responsive to the notification of the start of the communication phase;
program code to communicate the value of each source data field updated during processing of the user request by the actioned one of the components to each of the set of cooperating components in the computer system having a linked destination data field;
program code to notify the set of cooperating components in the computer system when the communication phase has ended, responsive to completion of the user request by the actioned component and rendering of updated content by the actioned component; and
program code to permit rendering of the set of cooperating components after the communication phase, responsive to notification of the cooperating set of components of the end of the communication phase, by passing uniform resource locators (URLs) of the corresponding portlets to the embedded web browsers of the cooperating components.

36. A client computer system according to claim 35, further comprising program code operable to communicate the updated data value to one or more further component(s) when a destination data field of a destination component in the set of cooperating components is also a source data field linked to a data field of said one or more further component(s).

37. A client computer system according to claim 35, further comprising program code operable to communicate the value of each source data field updated during processing of the user request by the actioned component to each component in the set of cooperating components having a linked destination data field.

38. A client computer system according to claim 35, further comprising program code operable to communicate an updated value of a source data field to each destination data field linked thereto, if processing of the received updated value by a destination component in the set of cooperating components updates a value of a source data field of the destination component.

39. A computer program product including a computer readable storage medium, said computer readable storage medium having program code stored thereon for communicating data between components in a client computer system, the client computer system having a user interface for displaying a page comprising content rendered by a plurality of components, wherein the program code comprises:

- program code for providing a property broker for maintaining a registry of linked source and destination data fields of components of the client computer system;
- program code for notifying the property broker when a user request is detected by an actioned component registered with the property broker;
- program code for notifying, by the property broker responsive to the notifying of the property broker when the user request is detected, a set of cooperating components registered with the property broker of a start of a communication phase, each of the cooperating components and the actioned component comprising a portlet displayed by the client computer system in a separate corresponding view window having a frame and at least one control associated with the view window, each view window further having a separate embedded web browser that requests a web page for the corresponding portlet from a remote portlet server and that displays the portlet within the view window;
- program code for preventing rendering of the set of cooperating components during the communication phase, responsive to the notifying by the property broker of the start of the communication phase;
- program code for processing the user request by the actioned component;
- program code for communicating the value of each source data field updated during processing of the user request to each of the set of cooperating components having a linked destination data field;
- program code in the property broker for notifying said set of cooperating components of an end of the communication phase responsive to completion of the processing of the user request by the actioned component and rendering the updated content by the actioned component; and
- program code for permitting rendering of the set of cooperating components after the communication phase, responsive to the property broker notifying the set of cooperating components of the end of the communication phase, by passing uniform resource locators (URLs) of the corresponding portlets to the embedded web browsers of the cooperating components.

* * * * *